US012235034B2

(12) United States Patent
Denison et al.

(10) Patent No.: US 12,235,034 B2
(45) Date of Patent: Feb. 25, 2025

(54) VENDING LOCK

(71) Applicant: TriTeq Lock and Security, LLC, Elk Grove Village, IL (US)

(72) Inventors: William Denison, North Barrington, IL (US); Calin Roatis, Long Grove, IL (US)

(73) Assignee: TriTeq Lock and Security, LLC, Elk Grove Village, IL (US)

( * ) Notice: Subject to any disclaimer, the term of this patent is extended or adjusted under 35 U.S.C. 154(b) by 1188 days.

(21) Appl. No.: 16/750,680

(22) Filed: Jan. 23, 2020

(65) Prior Publication Data

US 2020/0191469 A1 Jun. 18, 2020

Related U.S. Application Data

(63) Continuation of application No. 15/965,322, filed on Apr. 27, 2018, now Pat. No. 10,584,912, which is a (Continued)

(51) Int. Cl.

*F25D 23/02* (2006.01)

*E05B 47/06* (2006.01)

(Continued)

(52) U.S. Cl.

CPC ........ *F25D 23/028* (2013.01); *E05B 47/0603* (2013.01); *E05B 65/0046* (2013.01);

(Continued)

(58) Field of Classification Search

CPC ............... F25D 23/028; E05B 47/0603; E05B 65/0046; E05B 65/0811; E05B 47/0001;

(Continued)

(56) References Cited

U.S. PATENT DOCUMENTS 4,891,755 A 1/1990 Asher
7,360,369 B2 4/2008 Tamborra (Continued)

FOREIGN PATENT DOCUMENTS

DE 3424425 A1 5/1985
DE 3424425 C2 12/1986

(Continued)

OTHER PUBLICATIONS

Royal Vendors, Helpful Hints—clear & easy—065, Health Safety Controller Test, Models RVCH-027, RVCFH-027, Revision: 01, Oct. 2, 2015, 2 pages.

(Continued)

*Primary Examiner* — Mark A Williams

(74) *Attorney, Agent, or Firm* — Charles T. Riggs, Jr.

(57) ABSTRACT

A cooler access control system locks a cooler when occurrence of an event is detected that requires limiting access to the inside of the cooler. Examples of such events include the loss of power to the cooler for a predetermined period of time, the opening of the cooler door for longer than an allowed time, the loss of functionality of a temperature probe and others. In an embodiment, a service mode is supported wherein the door is left unlocked despite the occurrence of such an event, to allow a stocker or other personnel to leave the cooler door open while stocking the cooler with product.

102 Claims, 17 Drawing Sheets

Related U.S. Application Data continuation of application No. 13/930,664, filed on Jun. 28, 2013, now Pat. No. 10,591,201.

(60) Provisional application No. 61/754,332, filed on Jan. 18, 2013.

(51) Int. Cl.

| | |
|---|---|
| ***E05B 65/00*** | (2006.01) |
| ***E05B 65/08*** | (2006.01) |
| *E05B 47/00* | (2006.01) |
| *E05B 73/00* | (2006.01) |

(52) U.S. Cl.

CPC ........... *E05B 65/0811* (2013.01); *E05B 47/00* (2013.01); *E05B 47/0001* (2013.01); *E05B 47/0012* (2013.01); *E05B 2047/0024* (2013.01); *E05B 2047/0069* (2013.01); *E05B 73/00* (2013.01); *E05B 73/0005* (2013.01); *E05B 73/0017* (2013.01); *E05B 73/0082* (2013.01); *Y10T 70/40* (2015.04); *Y10T 70/5009* (2015.04); *Y10T 70/625* (2015.04); *Y10T 70/70* (2015.04); *Y10T 70/7006* (2015.04)

(58) Field of Classification Search

CPC .. E05B 47/0012; E05B 73/00; E05B 73/0005; E05B 73/0017; E05B 73/0082; E05B 2047/0024; E05B 2047/0069; Y10T 70/5009; Y10T 70/625; Y10T 70/70; Y10T 70/40; Y10T 47/00

See application file for complete search history.

(56) References Cited

U.S. PATENT DOCUMENTS

| | | | | |
|---|---|---|---|---|
| 7,630,864 | B2 | 12/2009 | Shoenfeld | |
| 8,199,019 | B2 * | 6/2012 | Kaczmarz | F25D 29/008 340/585 |
| 8,773,270 | B2 | 7/2014 | Paydar et al. | |
| 8,970,344 | B2 * | 3/2015 | Payson | G07C 9/00912 340/5.2 |
| 10,495,377 | B2 | 12/2019 | Linney, II | |
| 10,612,833 | B2 | 4/2020 | Denison | |
| 2003/0083943 | A1 | 5/2003 | Adams et al. | |
| 2006/0225443 | A1 | 10/2006 | Tamborra | |
| 2006/0237427 | A1 | 10/2006 | Logan | |
| 2007/0024062 | A1 * | 2/2007 | Compeau | E05C 3/24 292/199 |
| 2007/0208598 | A1 | 9/2007 | McGrady et al. | |
| 2007/0227204 | A1 * | 10/2007 | Shoenfeld | A61B 50/10 70/101 |
| 2007/0227913 | A1 | 10/2007 | Shoenfeld | |
| 2009/0235767 | A1 * | 9/2009 | Garneau | E05C 3/24 292/201 |
| 2010/0300130 | A1 | 12/2010 | Shoenfeld et al. | |
| 2010/0300159 | A1 | 12/2010 | Berg et al. | |
| 2011/0069914 | A1 * | 3/2011 | Hashemi | E05B 47/00 384/21 |
| 2011/0208550 | A1 | 8/2011 | Lamarche et al. | |
| 2012/0004769 | A1 | 1/2012 | Hallenbeck et al. | |
| 2012/0176245 | A1 | 7/2012 | Paydar et al. | |
| 2013/0065666 | A1 | 3/2013 | Schueller et al. | |
| 2013/0168975 | A1 * | 7/2013 | Im | F25D 23/025 292/195 |
| 2013/0227971 | A1 * | 9/2013 | Tamborra | F25D 29/008 62/62 |
| 2013/0284806 | A1 | 10/2013 | Margalit | |
| 2014/0202220 | A1 * | 7/2014 | Denison | F25D 23/028 70/266 |
| 2015/0308158 | A1 * | 10/2015 | Jeon | E05B 65/0042 312/405 |
| 2016/0169578 | A1 | 6/2016 | Linney, II | |
| 2016/0208520 | A1 * | 7/2016 | Jordan | E05B 65/46 |
| 2016/0244995 | A1 * | 8/2016 | Gartner | E05B 37/00 |
| 2017/0260775 | A1 * | 9/2017 | Denison | E05C 7/04 |

FOREIGN PATENT DOCUMENTS

| | | | |
|---|---|---|---|
| DE | 10236777 | | 3/2004 |
| EP | 1 388 604 | A1 | 2/2004 |
| EP | 2479082 | A2 | 7/2012 |
| JP | 4727101 | B2 | 7/2011 |
| WO | WO 2013/059716 | | 10/2013 |
| WO | WO 2014/201148 | A1 | 12/2014 |

OTHER PUBLICATIONS

Royal Vision Cooler, RVCH-027, Health Safety Controller Information, Royal Vendors, Inc., 83301 Rev. 1, Jun. 2013, 20 pages.

Royal Vision Cooler, Operation, Service, and Parts Manual, Royal Vendors, Inc., 833097 Rev. 01b, Jul. 2012, 28 pages.

Royal Vendors, Vision Freezer, Health Timer, Model RVZFH-027, 2 page brochure, Mar. 2015.

Royal Vendors, Helpful Hints—clear & easy—008, Revised Serial Number Format, Revision: 05, Apr. 22, 2010, 1 page.

Royal Vendors, Inc., Merlin IV, Service and Parts Manual, P/N 833021, Rev 19a, Apr. 2011, 104 pages.

https://web.archive.org/web/20220616004956/http://www.amequipmentsales.com:80/, printed Oct. 21, 2022, 6 pages.

Royal Vendors, Vision Freezer, Health Timer, Model RVCFH-027, 2 page brochure, Jan. 2013 (color).

Royal Vendors, Vision Freezer, Health Timer, Model RVCFH-027, 2 page brochure, Jan. 2013 (grayscale).

Royal Vision Cooler, RVCH-027, Health Safety Controller Information, Royal Vendors, Inc., Nov. 2011, 12 pages.

Royal Vendors, Health Safety Freezer, Operation, Service, and Parts Manual, Royal Vendors, Inc., 833120 Rev. 07, Nov. 2017, 40 pages.

Miscellaneous pictures, document bates numbered MF_0002205-MF_0002328, produced by defendant Minus Forty Technologies Corp. in Docket No. 6:22-cv-378, Western District of Texas, 124 pages.

File History of U.S. Appl. No. 15/852,709, filed Dec. 22, 2017, Denison et al., 275 pages.

File History of U.S. Appl. No. 61/754,332, filed Jan. 18, 2013, Denison et al., 36 pages.

File History of U.S. Appl. No. 13/930,664, filed Jun. 28, 2013, Denison et al., 1414 pages.

English Abstract and Translation (Patent Translate—EPO and Google) of JP 4727101 B2 ,Yasuo et al., Jul. 20, 2011, 11 pages.

English Abstract and Translation (Patent Translate—EPO and Google) of DE 3424425 C2, Coquelin, Dec. 4, 1986, 9 pages.

English Abstract and Translation (Patent Translate—EPO and Google) of EP2479082A2, Hipp et al., Jul. 25, 2012, 24 pages.

English Abstract and Translation (Patent Translate—EPO and Google) of EP1388604A1, Harrer et al., Feb. 11, 2004, 13 pages.

English Translation (Patent Translate—EPO and Google) of DE3424425A1, 5 pages.

Certified priority document U.S. Appl. No. 61/833,493, Linney II, filed Jun. 11, 2013, from PCT/US2014/041959 filed Jun. 11, 2014, date of receipt at International Bureau Jul. 4, 2014, 37 pages.

Screenshots of a 24 second video of an electrical component, video produced by defendant Minus Forty Technologies Corp. in Docket No. 6:22-cv-378, Western District of Texas, 25 pages.

Defendants' Preliminary Invalidity Contentions dated Nov. 4, 2022, produced by defendant Minus Forty Technologies Corp. in Docket No. 6:22-cv-378, Western District of Texas, 20 pages.

Exhibit A to Defendants' Preliminary Invalidity Contentions dated Nov. 4, 2022, produced by defendant Minus Forty Technologies Corp. in Docket No. 6:22-cv-378, Western District of Texas, 3 pages.

Exhibit B to Defendants' Preliminary Invalidity Contentions dated Nov. 4, 2022, produced by defendant Minus Forty Technologies Corp. in Docket No. 6:22-cv-378, Western District of Texas, 1 page.

(56) References Cited

OTHER PUBLICATIONS

Exhibit C to Defendants' Preliminary Invalidity Contentions dated Nov. 4, 2022, produced by defendant Minus Forty Technologies Corp. in Docket No. 6:22-cv-378, Western District of Texas, 104 pages.
Exhibit D to Defendants' Preliminary Invalidity Contentions dated Nov. 4, 2022, produced by defendant Minus Forty Technologies Corp. in Docket No. 6:22-cv-378, Western District of Texas, 45 pages.
Exhibit E to Defendants' Preliminary Invalidity Contentions dated Nov. 4, 2022, produced by defendant Minus Forty Technologies Corp. in Docket No. 6:22-cv-378, Western District of Texas, 34 pages.
Exhibit F to Defendants' Preliminary Invalidity Contentions dated Nov. 4, 2022, produced by defendant Minus Forty Technologies Corp. in Docket No. 6:22-cv-378, Western District of Texas, 23 pages.
Miscellaneous pictures, document bates numbered MF_0003160-MF_0003240, produced by defendant Minus Forty Technologies Corp. in Docket No. 1:2023-cv-01300, Northern District of Illinois, identified as Royal Vendors, Inc., Royal Vision Cooler, Model RVCH-027, Serial No. 201248RA00025, 81 pages.
Miscellaneous pictures, document bates numbered MF_0003117-MF_0003159, produced by defendant Minus Forty Technologies Corp. in Docket No. 1:2023-cv-01300, Northern District of Illinois, identified as Royal Vendors, Inc., Royal Vision Cooler, Model RVCH-027, Serial No. 2011144RA00019, 43 pages.
Royal Vendors, Inc., Royal Vision Cooler, RVCH-027, Health Safety Controller Information, Royal Vendors Publication No. 833106, Rev. 01, Jun. 2013, 20 pages.
Royal Vendors, Inc., Royal Vendors Helpful Hints 0038: Disabling Milk Merchandiser Health Sensor, Rev. 00, Jun. 5, 2006, 1 page.
Royal Vendors, Inc., Royal Vendors Helpful Hints 065: Health Safety Controller Test, Rev. 01, Oct. 2, 2015, 2 pages.
Royal Vendors, Inc., Royal Vendors Service Bulletin 375: Health Safety Cooler to Standard Cooler Conversion Kit Installation, Rev. 00, Apr. 5, 2013, 5 pages.
Royal Vendors, Inc., Milk Merchandiser, Service and Parts Manual, Royal Vendors Publication No. 833060 Rev. B2, Sep. 2005, 78 pages.
Royal Vendors, Inc., Milk Merchandiser, Service and Parts Manual, Royal Vendors Publication No. 833060 Rev. B3, Jun. 2006, 78 pages.
NAMA, Standard for the Sanitary Design and Construction of Food and Beverage Vending Machines, Revised Apr. 2012, 54 pages.
NAMA, Standard for the Sanitary Design and Construction of Food and Beverage Vending Machines, Revised. Apr. 2013, 55 pages.
Abstract and English Translation (Patent Translate—EPO and Google) of DE 10236777 A1, Harrer et al., Mar. 4, 2004, 14 pages.
Canadian Patent 2914008 Summary of Linney II, International Publication No. WO2014/201148, Dec. 18, 2014, 3 pages.

* cited by examiner

VENDING LOCK

RELATED APPLICATIONS

This application is a continuation of U.S. application Ser. No. 15/965,322 filed on Apr. 27, 2018, which is a continuation of U.S. application Ser. No. 13/930,664, entitled "Cooler Lock" filed on Jun. 28, 2013, which is related to and claims priority to U.S. Provisional Application Ser. No. 61/754,332, entitled "Cooler Lock," filed on Jan. 18, 2013, which applications are herein incorporated by reference in their entirety for all that they suggest, disclose, and teach, without exclusion of any portion thereof.

TECHNICAL FIELD OF THE DISCLOSURE

The disclosure is directed generally to enclosure locking mechanisms, and, more particularly, to an access control system that includes features for providing locking and access to a refrigerated cooler. The lock mechanism consists of a strike mounted on the door or cabinet, and a motor-controllable latch mounted on the other of the door or cabinet.

DETAILED DESCRIPTION

A refrigerated cooler typically consists of a refrigerated cabinet to hold food and beverages and a glass door that swings outward via a hinge. Typically the door or the cabinet has a rubber gasket or other flexible sealing element (collectively "gasket") along the edge to create a barrier between the cold air inside the cabinet and the warm air outside the cabinet. The gasket further serves to accommodate misalignments between the cabinet and the door, when for example the cooler is placed on a floor that is not level such that the structure is twisted, or when over time the door droops downward from the hinge and fails to maintain alignment with the cabinet. Typically the inner surface of the door will interface to the outer surface of the cabinet, and as such the door usually does not reside on the interior of the cabinet. Typically the door is held to the edge surface of the cabinet by a magnet. In addition, typically the door is hung and the hinge is aligned such that the door is naturally biased to swing toward the cabinet without applying an external force to a surface of the door.

When the door is opened, e.g., by a consumer in order to retrieve product, and is then released, the door will naturally swing toward the closed position. As the door reaches the closed position from the open position, its movement is accelerating slightly and needs to be stopped. The gasket will serve to absorb some of the energy released by the door as it abruptly stops. The magnet serves to some extent to maintain the door in the closed position and the magnet and the gasket together also serve to minimize the amount of bounce the door may exhibit as it moves to a stopped position.

Figure 1A:
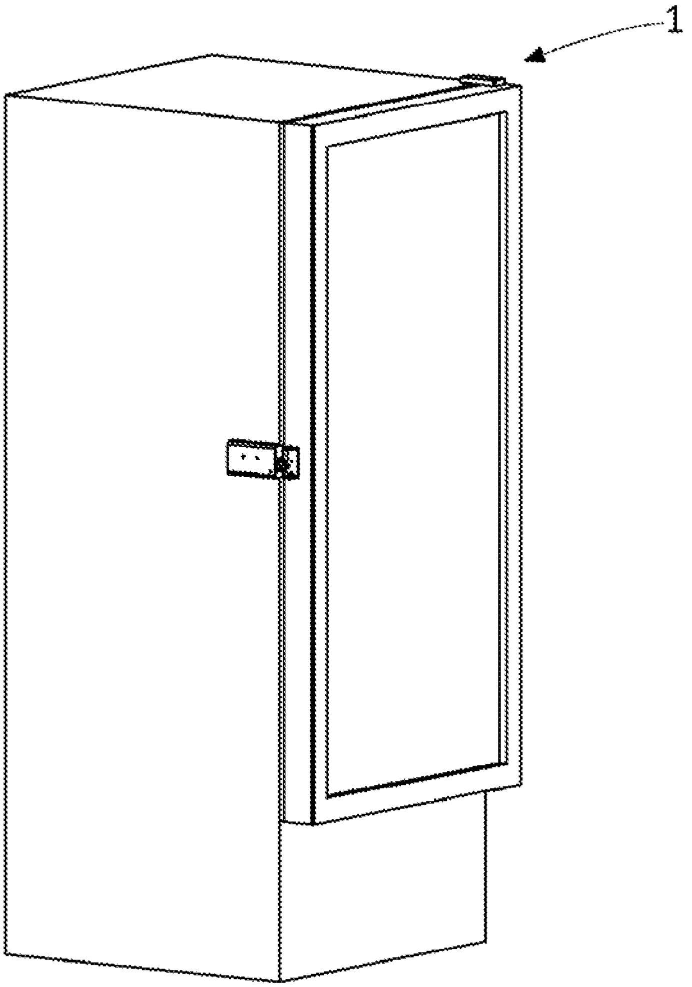
FIG. 1A is a simplified perspective view of a cooler structure within which aspects of the disclosure may be implemented.
Figure 1B:
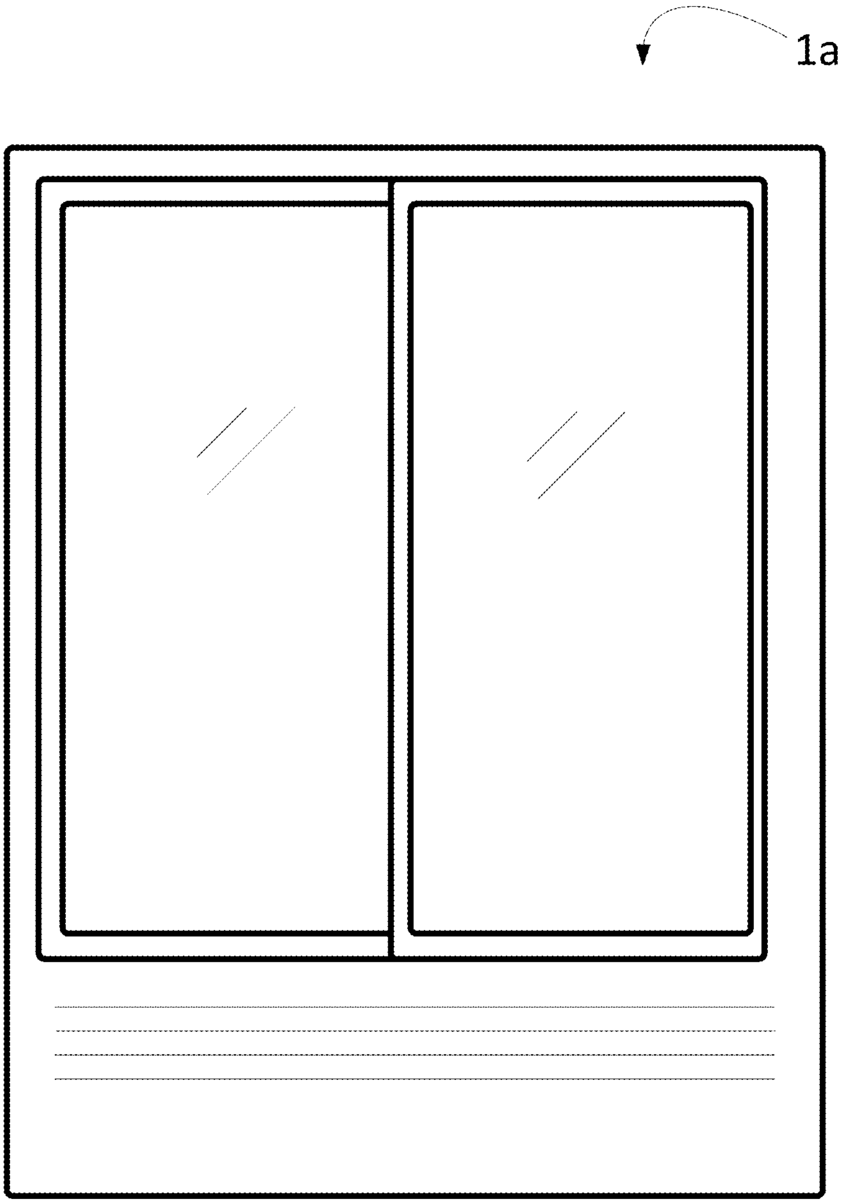
FIG. 1B is a simplified perspective view of an alternative cooler structure within which aspects of the disclosure may be implemented.
Figure 2:
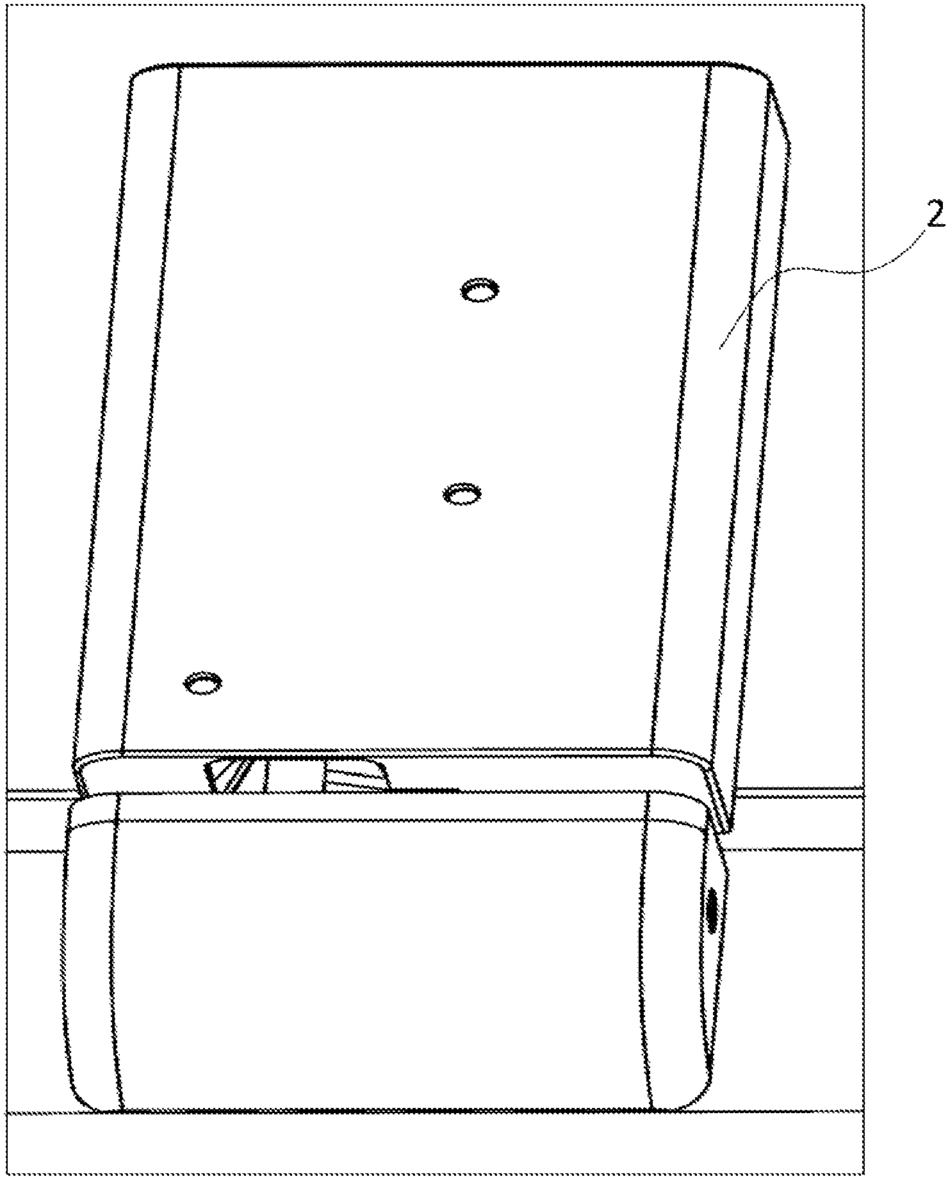
FIG. 2 is an enlarged perspective view of a cooler locking structure in accordance with an aspect of the disclosure.
Figure 3:
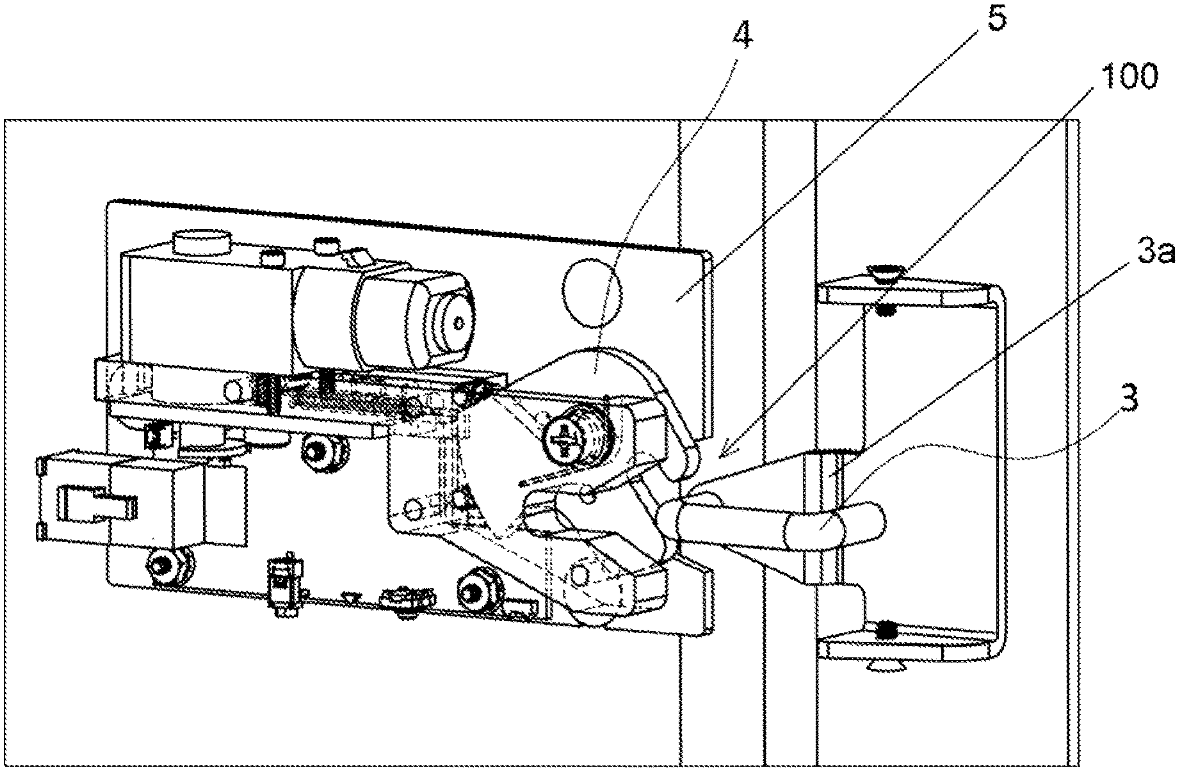
FIG. 3 is simplified interior view of the cooler locking structure of FIG. 2 in accordance with an aspect of the disclosure.

FIG. 1A is a perspective view of a cooler 1 within which embodiments of the invention may be implemented. FIGS. 2 and 3 illustrate the lock mechanism 2 mounted to the cooler 1, showing the lock 2 while the strike 3 is entering the latch 4, and the strike base 3*a* is entering the opening 100 in mounting base 5. The mechanism may be mounted in a door centered position on the vertical edge of the door/cabinet as shown in FIG. 1, and it can be mounted at the top or bottom of the door/cabinet at the vertical edge or along either of the horizontal edges at the top or bottom of the door/cabinet in order to hide or protect the mechanism from the reach of customers. In an embodiment shown, the lock mechanism is mounted to the cooler cabinet and the strike is mounted to the door. In alternative embodiments, the lock can be mounted to the door and the strike mounted to the cabinet. In another embodiment, the strike unit or function can be provided by the outside surface of the door, or a surface provided by a slot within either the door or the cabinet.

As noted above, in an embodiment, the lockable enclosure is a freezer. Moreover, whether a freezer or a cooler, enclosures having sliding rather than hinged doors may also benefit from application of the disclosed principles. Referring to FIG. 1B, typically such enclosures IA include two doors mounted in tracks adjacent to but offset from one another, with one or both doors being slidable across the front of the cooler. In such coolers, each door may also include a gasket on one or both of the door and the cabinet, used to seal the door and cabinet together when the door is closed. The sliding doors are typically biased to slide back to the closed position in the event that the user does not properly slide the door to the closed position. For sliding door coolers, the lock can be applied to either the door or the cabinet of each door, or, a lock can be applied to one door and the strike can be applied to the other door, such that when the lock and strike are engaged, neither door can slide open or parallel to the other door.

Figure 4:
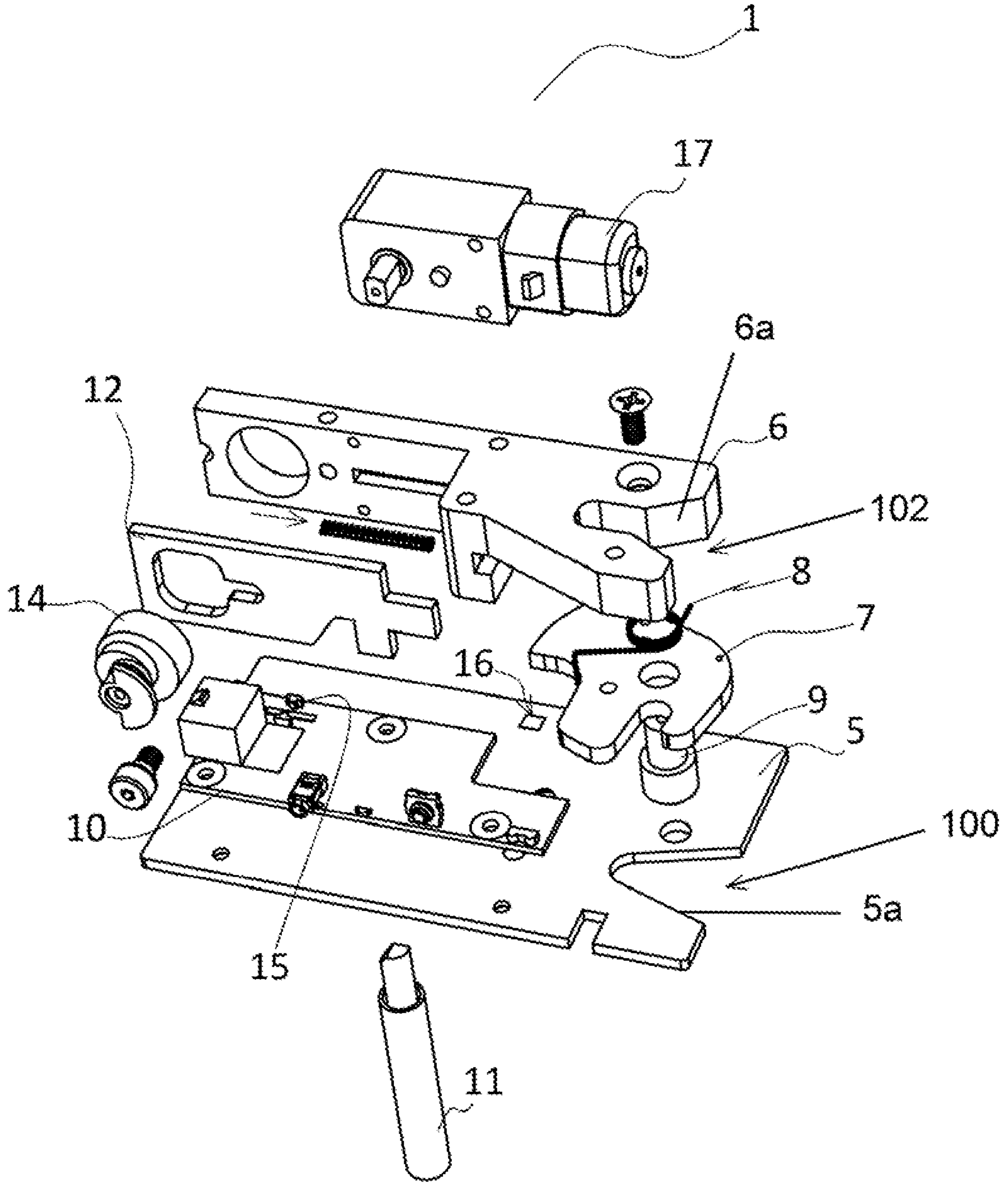
FIG. 4 is a simplified exploded view of the lock structure of FIG. 2 in accordance with an aspect of the disclosure.
Figure 5:
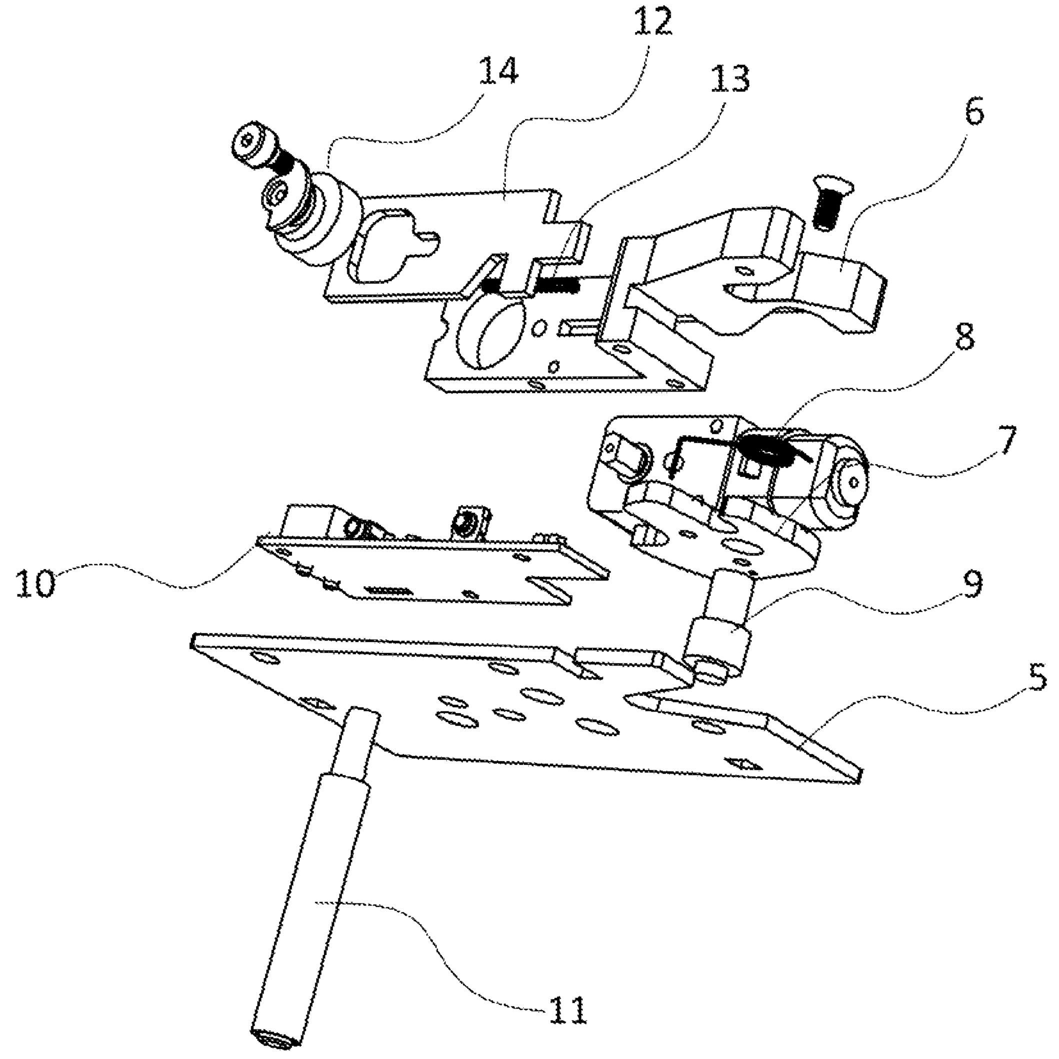
FIG. 5 is a further simplified exploded view of the lock structure of FIG. 2 in accordance with an aspect of the disclosure.
Figure 6:
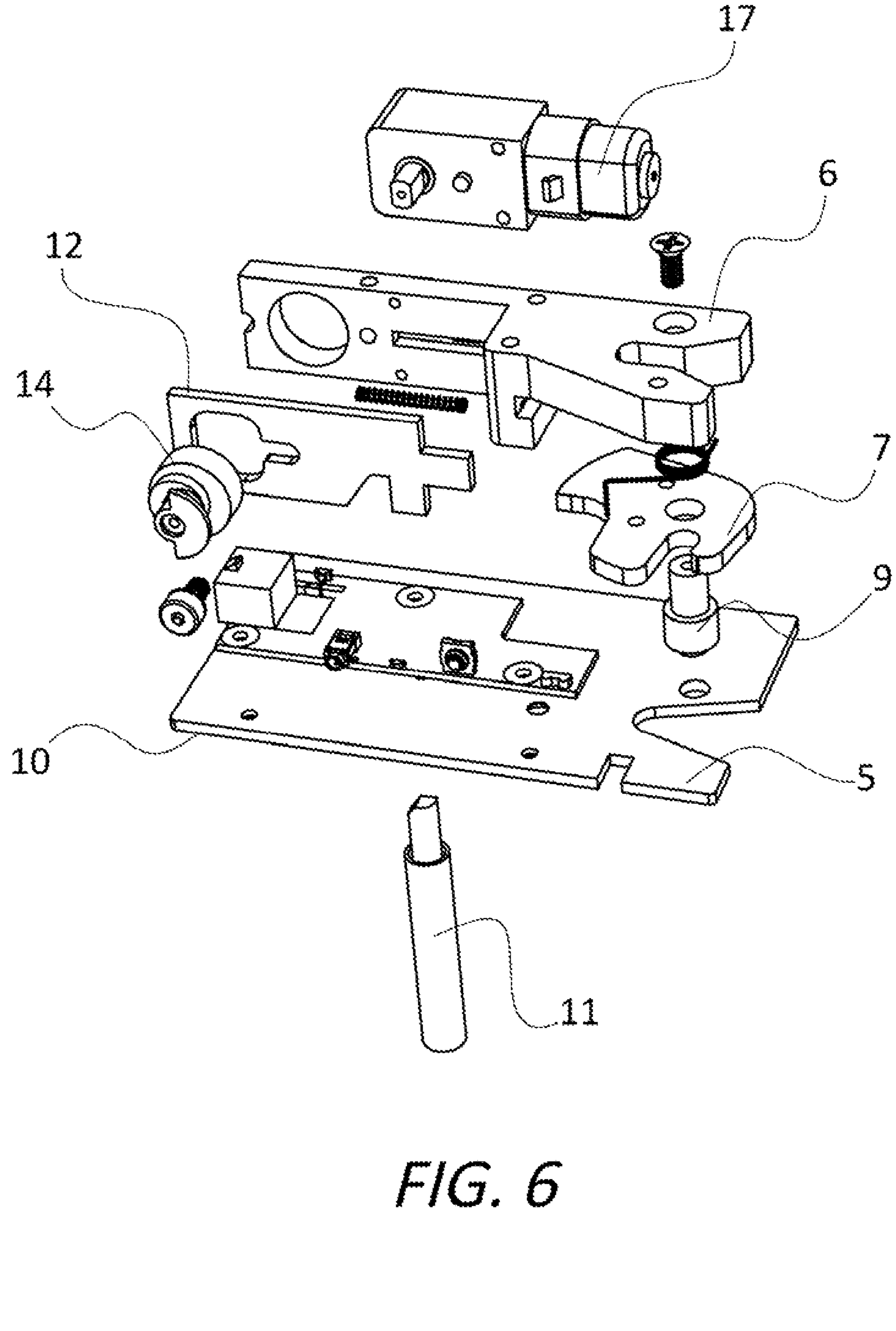
FIG. 6 is a further simplified exploded view of the lock structure of FIG. 2 in accordance with an aspect of the disclosure.
Figure 7:
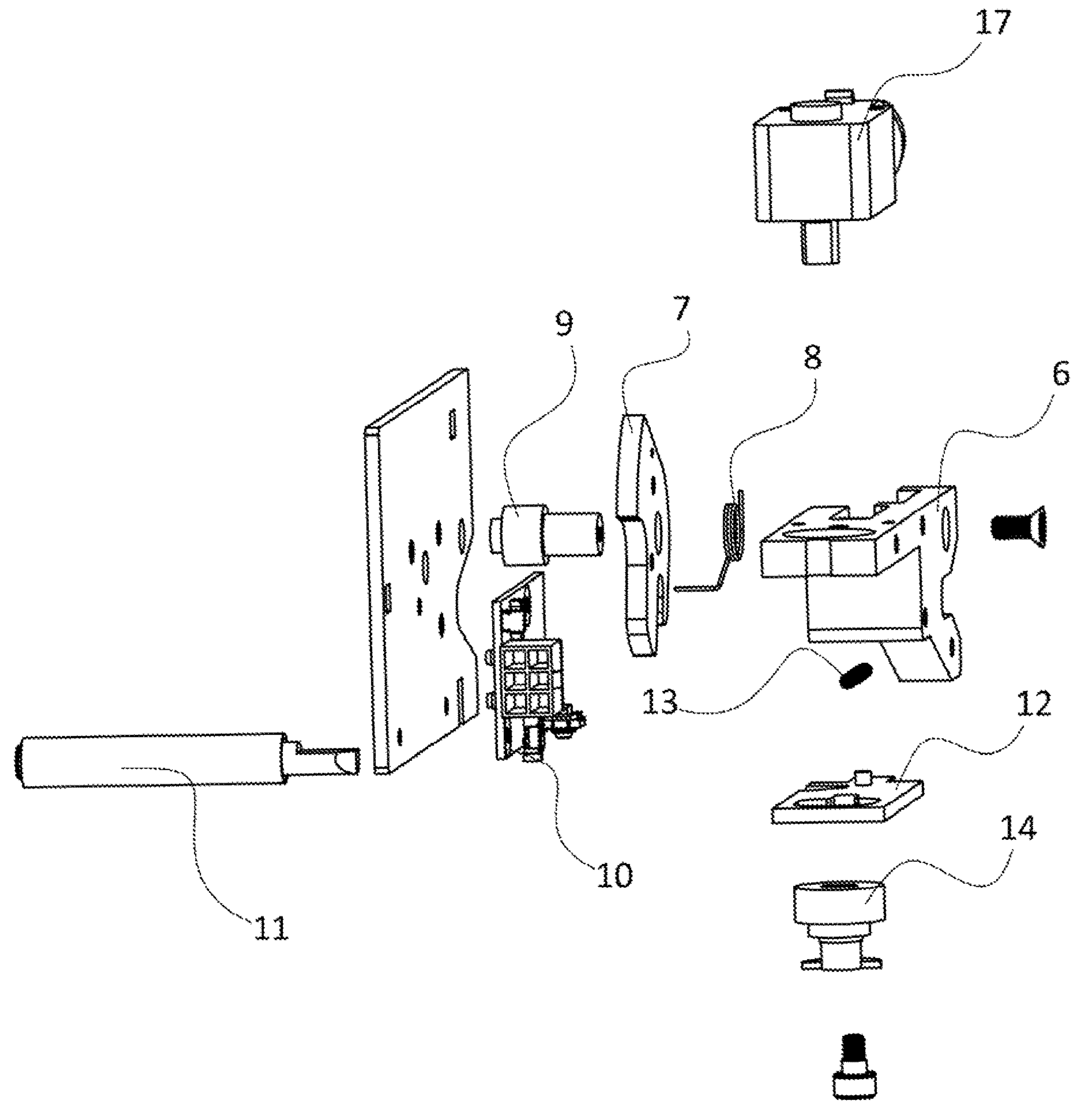
FIG. 7 is a further simplified exploded view of the lock structure of FIG. 2 in accordance with an aspect of the disclosure.

In any case, the lock mechanism consists of a number of components as labeled in FIG. 4 and as shown in different views in FIGS. 5-7. The components include the mounting base 5, latch base 6, claw 7 (i.e., the claw portion of latch 4), claw spring 8, shaft 9, circuit board 10, manual release push rod 11, slider 12, slider spring 13, cam 14, cam sensor 15, claw sensor 16, and motor 17. The components are primarily mounted to the latch base 6 and the mounting base 5, which are stationary. The mounting base 5 has a "V" shaped opening 100 and an angled surface Sa, and helps to guide the strike to connect to the claw 7 properly when the door is closed. The latch base 6 has a "Y" shaped opening 102 and an angled surface 6*a*, and serves to help guide the strike to connect to the claw 7 properly when the door is closed. The claw 7 rotates clock-wise and against the force of the claw spring 8 as the door is closed and it receives the strike. The force of the claw spring 8 is ideally light enough so the force of the door closing will overcome the claw spring force and the claw 7 will receive the strike and rotate clock-wise.

Figure 8:
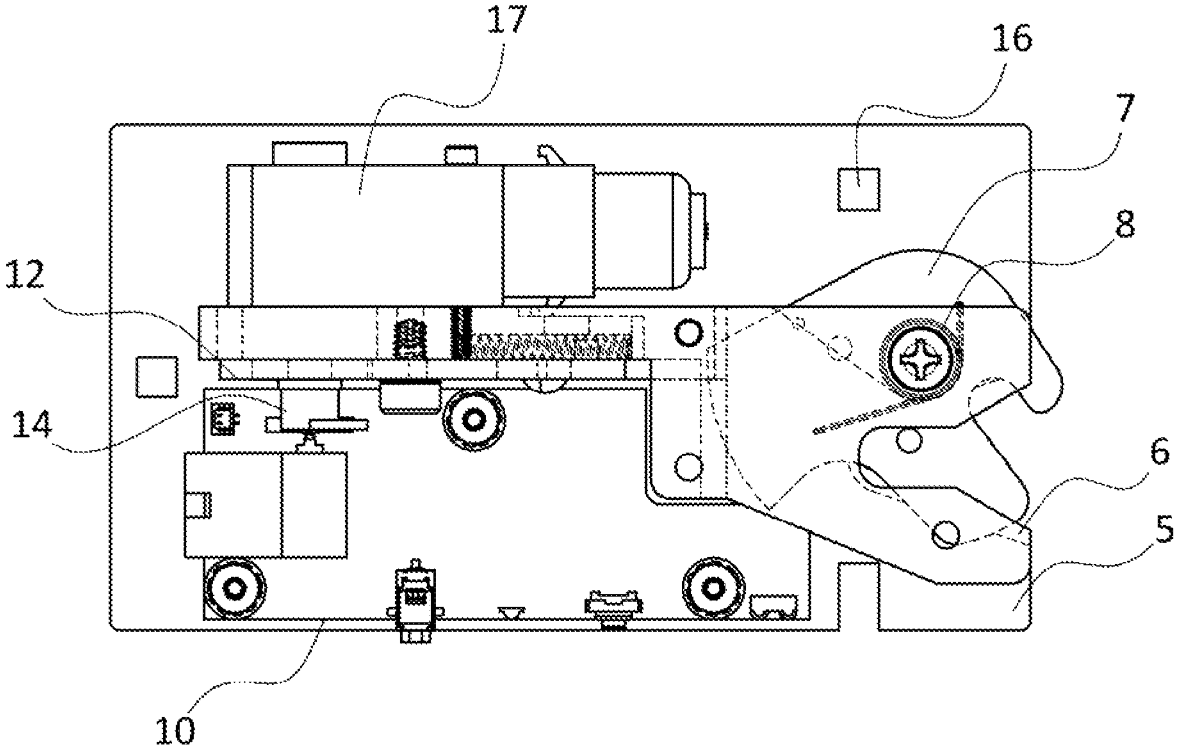
FIG. 8 is a further simplified interior view of the cooler locking structure of FIG. 2 in accordance with an aspect of the disclosure.
Figure 9:
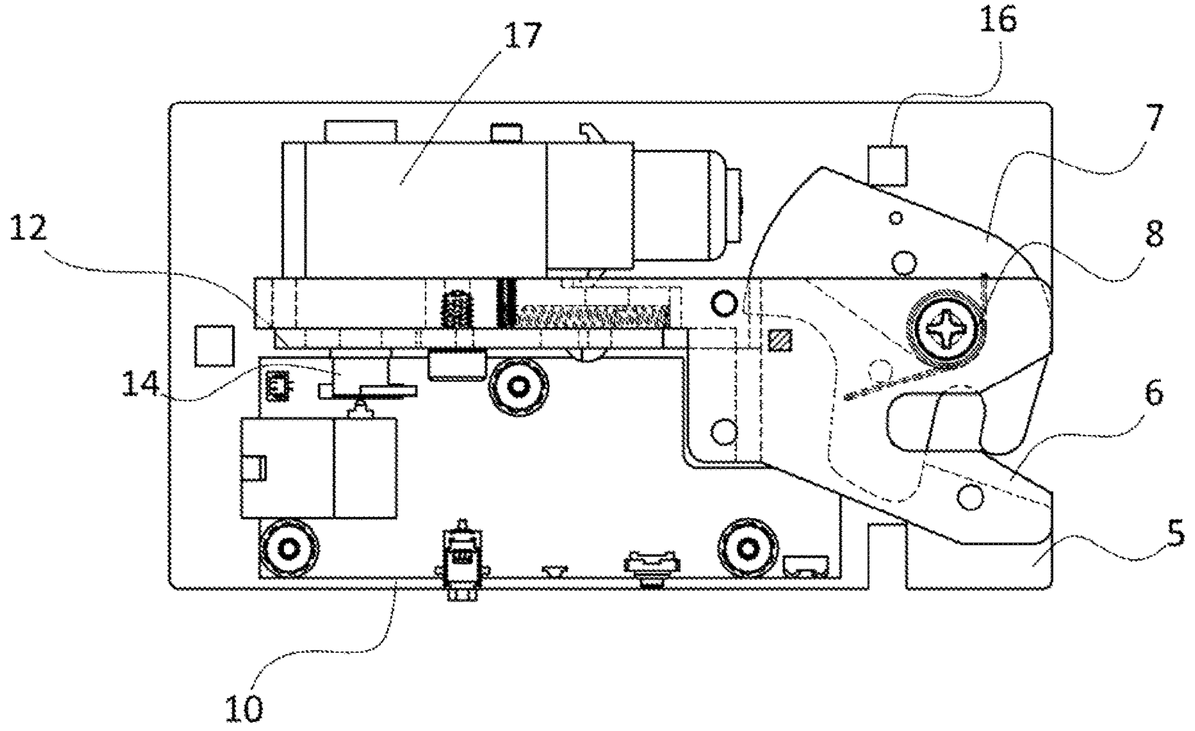
FIG. 9 is a further simplified interior view of the cooler locking structure of FIG. 2 in accordance with an aspect of the disclosure.

In the strike received position of FIG. 9, the claw sensor 16 will detect that the claw 7 has received the strike. The claw spring 8 is biased to push the claw 7 out so when the door is opened the claw 7 will rotate counter-clockwise to move to the receive position as in FIG. 8. This cycle whereby the claw 7 rotates clockwise to counterclockwise while the door moves from closed to open repeats over and over again as food or other material is being vended from the cooler, as shown in FIGS. 8 and 9.

Figure 10:
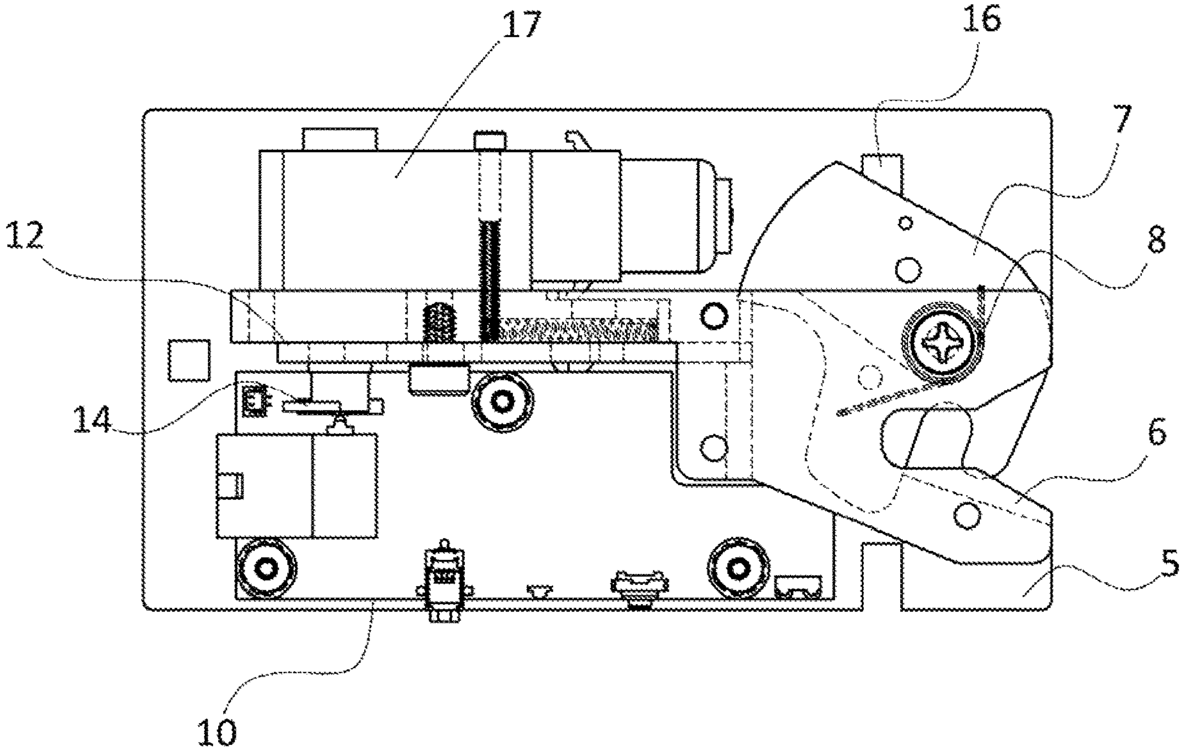
FIG. 10 is a further simplified interior view of the cooler locking structure of FIG. 2 in accordance with an aspect of the disclosure.

The slider 12 when extended to the right acts to lock the claw 7 holding the strike in the clockwise rotated position during certain conditions while the door is closed, as shown in FIG. 10. The slider 12 is biased to the locked extended position by the slider spring 13 when the door is intended to be locked. The cam 14 connected to the motor 17 will act to move the slider 12 via the inner surface of the slider 12 to the unlocked position upon being energized by the circuit board 10 as shown in FIG. 9. A cam sensor 15 on the circuit board 10 senses the position of the cam 14 to determine the slider 12 has moved to the required position.

Figure 11:
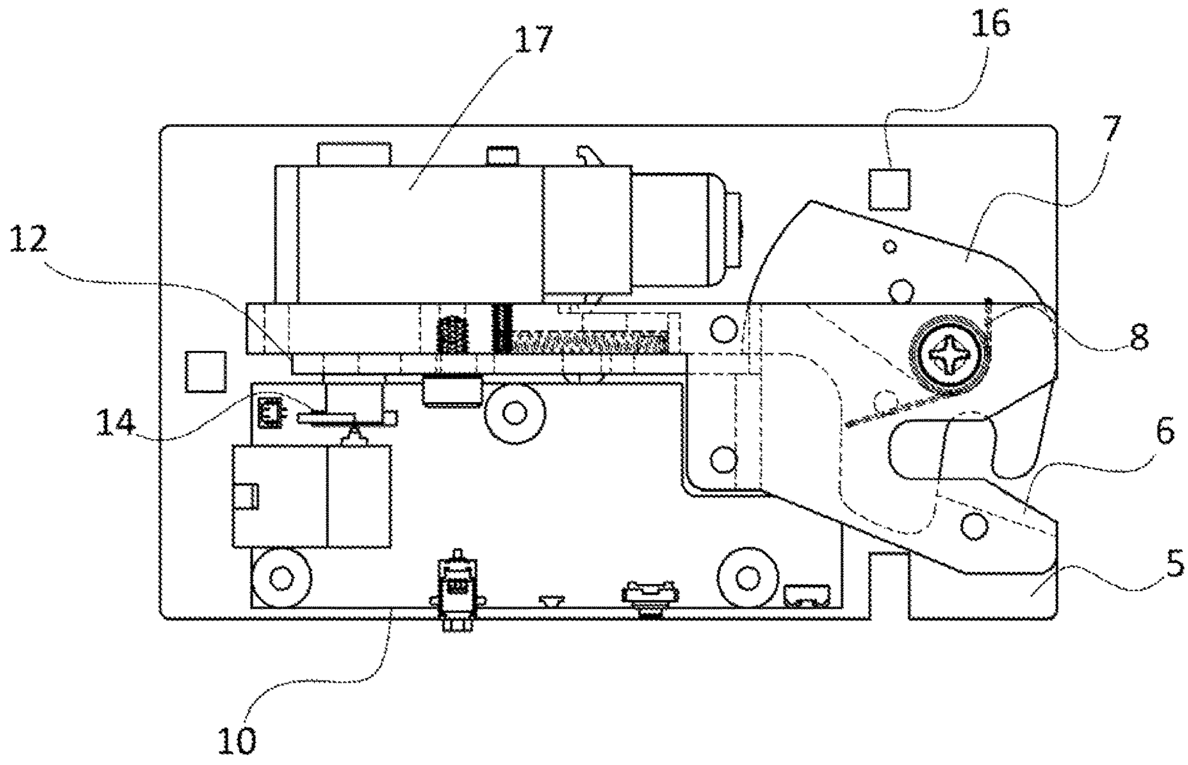
FIG. 11 is a further simplified interior view of the cooler locking structure of FIG. 2 in accordance with an aspect of the disclosure.
Figure 12:
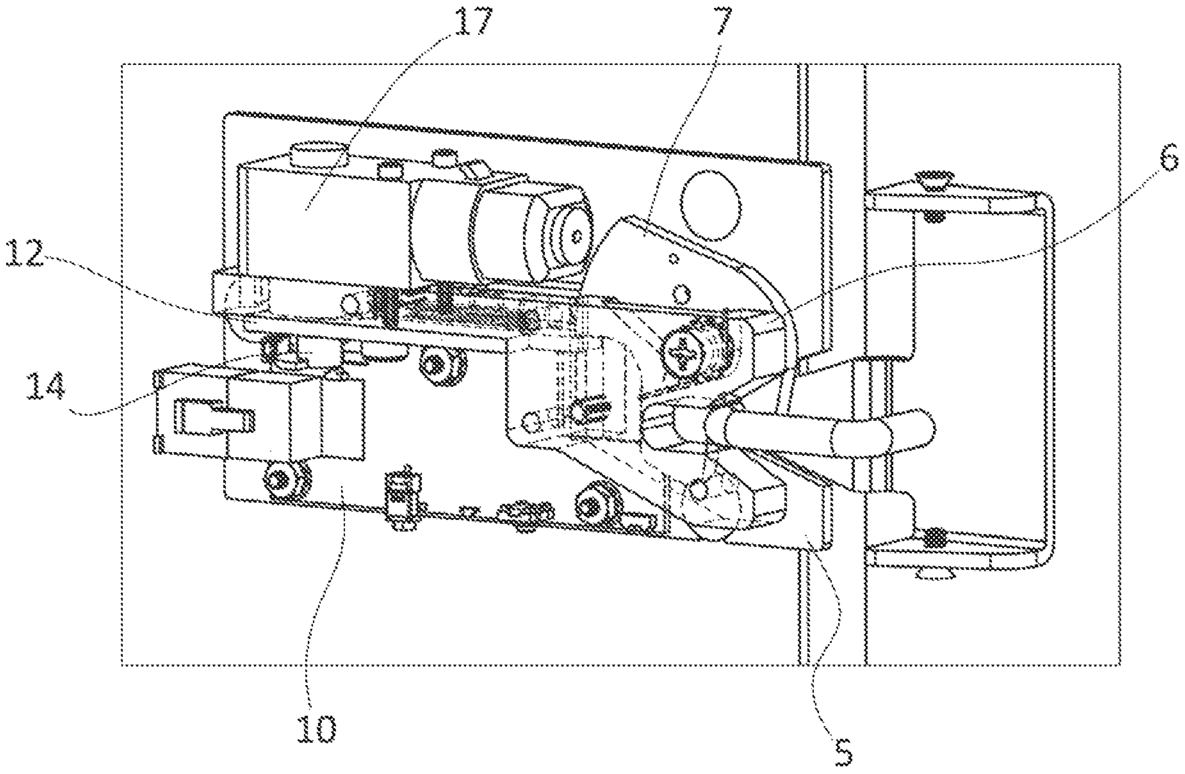
FIG. 12 is a further simplified interior view of the cooler locking structure of FIG. 2 in accordance with an aspect of the disclosure.

Once the slider 12 moves to the far right extended position behind the rear surface of the claw 7, the claw 7 will no longer be able to rotate counter-clock wise as the door is attempted to be opened as shown in FIG. 11; the rear surface of the claw 7 is blocked from rotating counterclockwise by the right extended edge of the slider 12. Thus, the claw 7 and extended slider 12 will serve to hold the strike in the position in FIG. 12 to keep the door closed or locked. Once the electronics determine the door should be unlocked, the motor 17 rotates and moves the cam 14 so that it applies a force to the slider 12 to make it retract, such that the slider 12 will no longer be in a position to hold the claw 7 in the full clockwise position as in FIG. 9. The claw will then be free to rotate counterclockwise as the door is pulled opened as in FIG. 8.

The manual release 11 serves to manually force the slider 12 from the rightward position to the leftward retracted position to release the slider interference from the claw 7, and allowing the door to be opened. The feature is useful in the event that a person, for example a child, climbs into the cooler and the cooler door closes and locks. A person inside the cooler can push the manual release 11, serving to apply a force to the inclined surface of the slider 12 so the slider 12 retracts by overcoming the force of the slider spring 13 and retracting to the left to release the lock. As an alternative to the push-rod method, a cable can be attached to, for example, the left end position of the slider 12 to pull the slider 12 to the retracted position to release the claw 7 and unlock the unit.

Figure 13:
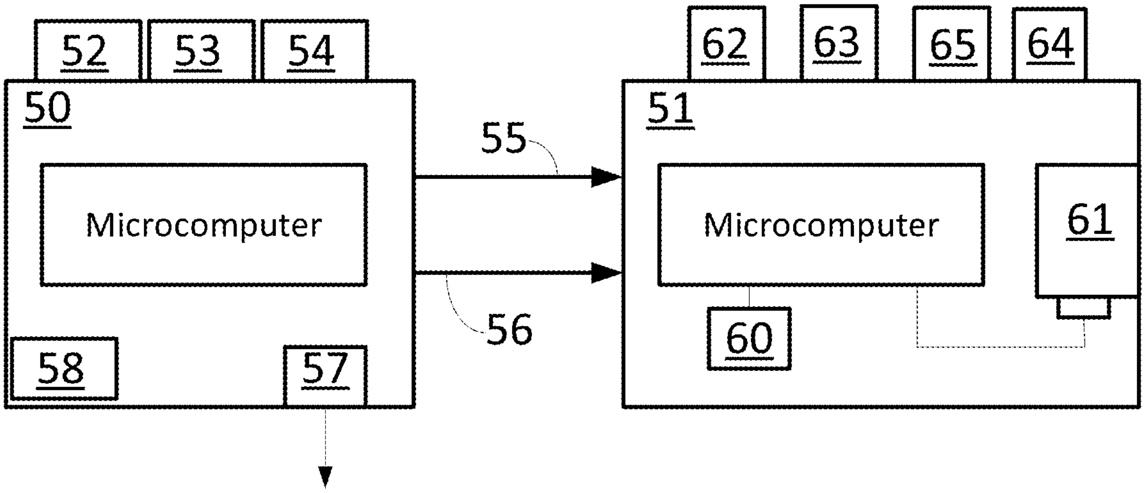
FIG. 13 is a simplified circuit diagram in accordance with an aspect of the disclosure.

In this embodiment, the cooler controller 10 comprises sensors and inputs for measuring a temperature of the enclosure 1 it is locking and unlocking; see FIG. 13. In one example, the cooler controller will control the actuator of an electronic lock mechanism based on the temperature of the enclosure. The cooler 1 has a refrigerator for maintaining products at a temperature around or below 42° F. As long as the temperature is maintained below the desired temperature of 42° F., the cooler can be opened by any patron who desires to open the door, so that the patron can select a product to be purchased.

When the door is closed, the strike mounted on the door is engaged with the latch mounted to the cabinet (or vice versa in an alternative embodiment). If the temperature is proper, for example 42° F. or less, and when the door is pulled open, the latch mechanism allows the strike to be released and the door will swing open. The temperature of the cooler can be communicated remotely over a local or wide-area network.

In the event that the temperature of the cooler exceeds a pre-determined limit for a period of time such as 45 minutes, there is a risk of spoilage of the food or beverage in the cooler. Thus, in an embodiment, when this occurs, the cooler controller proceeds to enable the lock controller and in turn the lock controller energizes the motor and latches the strike so that the door is locked and cannot be withdrawn from the cabinet. The locking event can be communicated remotely over a local or wide-area network. If the temperature returns to a safe/proper temperature, it may be possible for the controller to determine the contents are safe to consume because the cooler temperature only stayed in the elevated range for a short period of time, i.e., too short for the food to spoil. In such a case, the controller may unlock the door.

In another example, the status of the sensors is communicated to a person remote to the cooler over a local or wide-area network, and this person may send a remote signal or command the controller to unlock the controller. As an alternative, the lock controller can also provide a local interface to an electronic or mechanical key or a keypad to signal the controller to unlock the door as shown in FIG. 13.

The latch provides a sensor for detecting the strike releasing from the latch and thus the door swinging open. This door opening sensor can be useful by the controller for measuring the time the door remains open, and alerting someone either locally or remotely (and/or storing this data remote to the cooler) that the door is open for too long to avoid spoilage of food or other items in the cooler.

The latch also comprises a sensor for detecting the locked/unlocked position of the latch. As the motor controls the latch to change states from locked to unlocked, or from unlocked to locked, the sensor will detect the change of state so the lock controller can properly control the state of the latch and report the state of the latch to a device external to the cooler.

The controllers may be powered by AC line voltage and by a battery as a back-up for example. The advantage of the combination of both the AC power and the battery is that the lock controller will be powered primarily from the AC power while it is assumed the cooler will also have the same AC power for operating the refrigerator. Thus the refrigerator should normally be successful keeping the temperature at or below 42° F. If and when the AC voltage is lost for an extended time period, it is expected the temperature in the cooler will increase to a temperature and for a time period that could cause the food and/or beverages to spoil. In the event of lost power, the controller has the capability, in an embodiment, to control the lock actuator to lock the door, or to latch the strike so the door cannot be withdrawn.

During the time that AC power is lost, the controller may be configured to continue to monitor all the sensors, such as for example, the temperature sensor, and also to measure elapsed time. Thus by conducting these measurements during a power outage, the controller(s) can determine if the temperature has exceeded certain undesirable levels for an extended period of time, in order to determine if the cooler can be unlocked to allow products to be distributed once the AC power resumes. In addition, the controllers can communicate status of the power and the sensor measurements during the power outage event.

In the event of a temperature limit event, the controllers may also serve to control alternative devices related to the cooler, such as the lighting for the cooler. For example, if the temperature limit is exceeded, the controller may be configured to turn off the lights of the cooler, to discourage patrons from trying to access the cooler (a cooler without lights would visually indicate the cooler has a malfunction).

Another feature of the cooler lock is to lock the door based on a timer or a schedule regardless of cooler temperature. For example, if the cooler is in an office that is typically closed after 6 PM, the cooler may be automatically locked after 6 PM to discourage maintenance or cleaning crews from taking items from the cooler. If the office re-opens at SAM, the cooler would unlock at approximately that time.

In another example, the cooler lock can be in a default locked state. In this embodiment, the patrons can select which products they intend to purchase before opening the cooler door and removing the products. After the products are selected and payment is collected or authorized by credit or debit card, the cooler door can be unlocked for either a) a short period of time, or b) a single access event so the customer can remove the purchased products. In this example, in the event the cooler temperature exceeds certain limits or power is lost as described above, the cooler would remain locked and the customers would be discouraged from paying for products.

Figure 14:
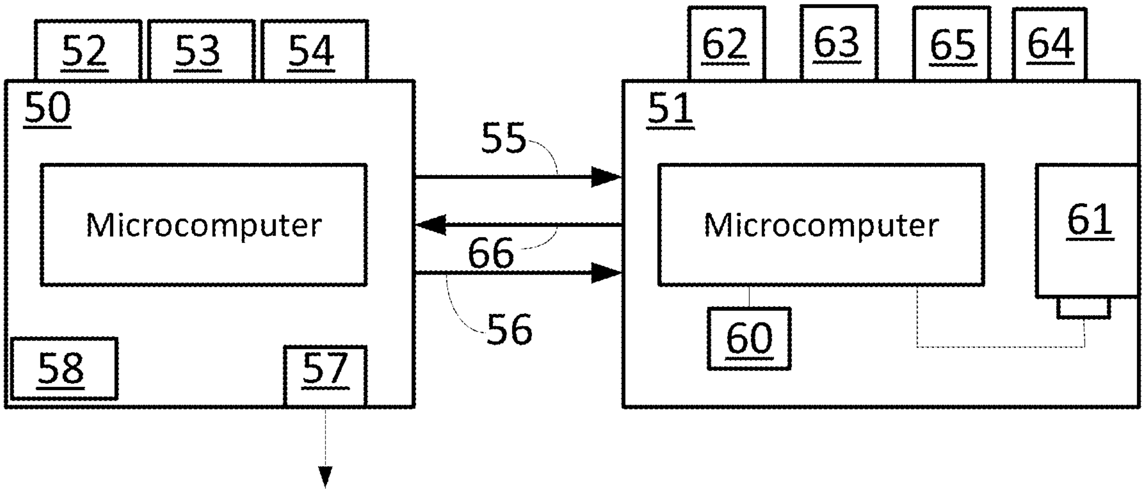
FIG. 14 is a simplified circuit diagram in accordance with an alternative aspect of the disclosure.

In another embodiment, the access control system further includes additional features for providing locking and access to a refrigerated cooler as in FIG. 1A. As shown in FIG. 14, while the cooler door is open the slider can move from the unlocked position shown initially in FIG. 8 to the locked position shown in FIG. 14. In FIG. 8, the cooler door is open, the claw is rotated counter clockwise, and the slider is in the unlocked position and retracted from touching the claw. In the event the door is unlocked and a customer opens the door to select a product, it is possible the controller could send a locked signal to the lock. This situation could take place if, for example, the door is left open for too long of a period of time. In this situation, it is desirable to move the slider to the extended locked position while the claw is rotated counter clockwise and to rest on the curved surface of the claw before the door is closed and before the claw is rotated clockwise.

Once the door is closed and then after the strike rotates the claw clockwise, the slider will continue to move to the extended position and block the movement of the claw, and will maintain the claw in the locked counterclockwise position as shown in FIG. 11. This feature provides for locking the cooler door upon closing the cooler door if a lock event is triggered while the cooler door is open. In another embodiment, if the cooler door is open and a lock event is triggered by a failed probe or an over temperature event, the lock delays the locking event until the cooler door is properly shut. This is accomplished by monitoring the door position, and if the door is open during the lock trigger event the lock, delaying going to the locked condition; later upon sensing the cooler door is closed, the lock then moves to the locked position and the door is locked.

In the embodiment, the lock controller can provide a reset signal to the cooler controller as described below. The reset signal source can come from another source, for example from a separate switch in a secured location (not shown) that is only reached via authorized access. In the event the cooler controller senses a cooler fault and sends the lock signal to the lock controller, and the lock controller locks the cooler door, the service technician must provide a system for repairing the equipment and resetting the lock and cooler controller. Once the lock controller has locked the cooler door, the lock controller is configured to sense a secured signal to indicate the cooler has been repaired and should be reset back to the unlocked condition. In this embodiment, the lock controller will sense a signal via the keypad or the key sensor, and when this signal is received the lock controller will unlock the cooler door and send a reset signal to the cooler controller, and the cooler controller will release lock signal to the lock controller. In another embodiment, the lock or cooler controller will sense a reset signal from a mechanical switch accessible by a mechanical or electronic lock.

Upon either a power-up condition or upon receiving a reset signal from the lock controller, the cooler controller will wait for the cooler to begin cooling and the temperature to reach a low temperature, for example 37° F., before proceeding to the lock control measurement algorithm. Prior to reaching the lower temperature, e.g., 37° F., the cooler controller will continue to output the unlock signal. Once a temperature of 37° F. or below is attained, the cooler controller begins the lock control algorithm and continues to output the unlock signal since the temperature is proper. Once the cooler controller measures a higher than normal temperature for a certain time period (over-temperature time), for example 42° F. for 15 minutes, the cooler controller will send the lock controller the lock signal.

The cooler or lock controller may be powered by a battery and may be programmed to lock the cooler door after loss of AC power, regardless if the temperature has exceeded the temperature limit of 42° F. This will insure the cooler door will be locked before the back-up battery has depleted, and it would be too late to lock the cooler door.

In an embodiment a service mode of operation is provided, whereby the cooler and lock controllers are placed into an operation mode that will not provide for the cooler door to be locked for a period of time typically longer than the over-temperature trigger time (for example ½ hour), so that the cooler can stand open and be loaded with products. After the service mode time period, the cooler controller resumes monitoring for a temperature default. It is desirable to exit the service mode after one single service mode time period, and to restrict consecutive service mode time periods.

As an alternative to a manually-entered service mode, in an embodiment, the cooler controller intelligently controls the service mode of the cooler by measuring the temperature rate of change. For example, if the temperature of the cooler rises above 42 degrees this could be due to either a fault of the cooler, or due to the cooler being refilled or serviced. After being filled or serviced, the door is closed and the temperature should begin to decrease rapidly toward the proper level provided the cooler is functioning properly. In this embodiment, when the cooler temperature exceeds the over-temperature trigger time while it is in the process of rapidly cooling down, the controller logic refrains from locking the cooler because as the controller measures the rapid rate of temperature change it can determine that a service condition is in process and determine to not lock the door, since it has determined that he temperature variation is not a faulty cooler refrigeration condition.

The cooler controller may also sense for a failed temperature probe in an embodiment, and may communicate a cooler lock event with the lock controller. The time period that the cooler controller senses for the failed probe before the lock signal is communicated from the cooler controller to the lock controller is typically shorter than the over-temperature delay time as described above. It is desirable to quickly lock the door in the event of a temperature probe fault because the integrity of the entire cooler system is in question, and the risk of serving spoiled food is minimized by locking the door. The cooler locking system may also include a test switch (not shown, typically mounted in a location that is easily accessible without the use of tools) that will be used by an equipment technician or health inspector to simulate an over-temperature condition or a failed probe condition to determine if the lock if functioning properly. In a working system, when the test switch is activated, the controller will sense (erroneously) that there is a malfunction of the cooler of the probe and will send a lock signal to the lock, and the cooler will proceed to lock. The system will return to normal operation after the switch is deactivated or if the system receives another signal, such as an access signal from the key or a reset signal.

Figure 15:
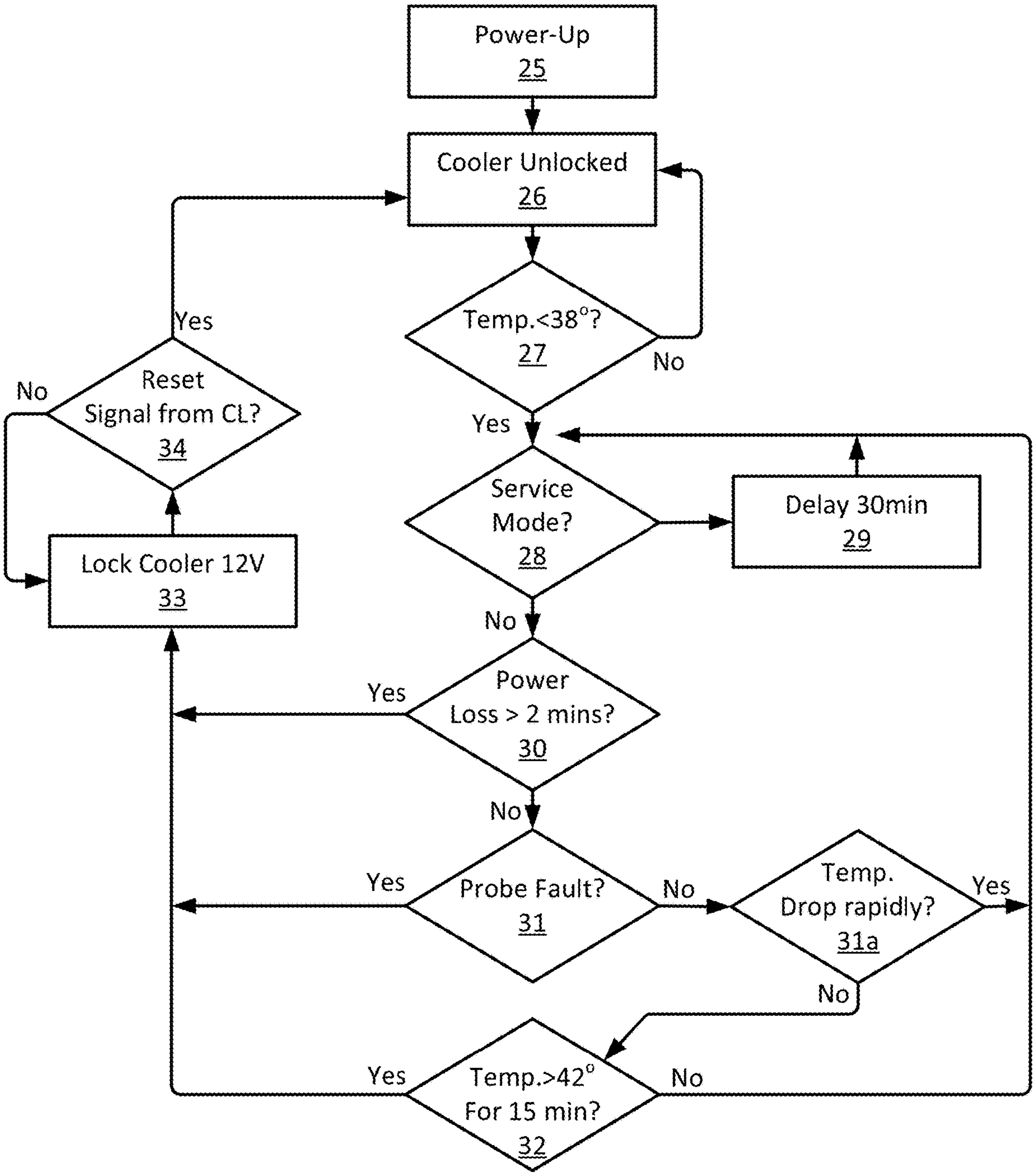
FIG. 15 is a process flow chart illustrating a process executed by a cooler controller in an embodiment.
Figure 16:
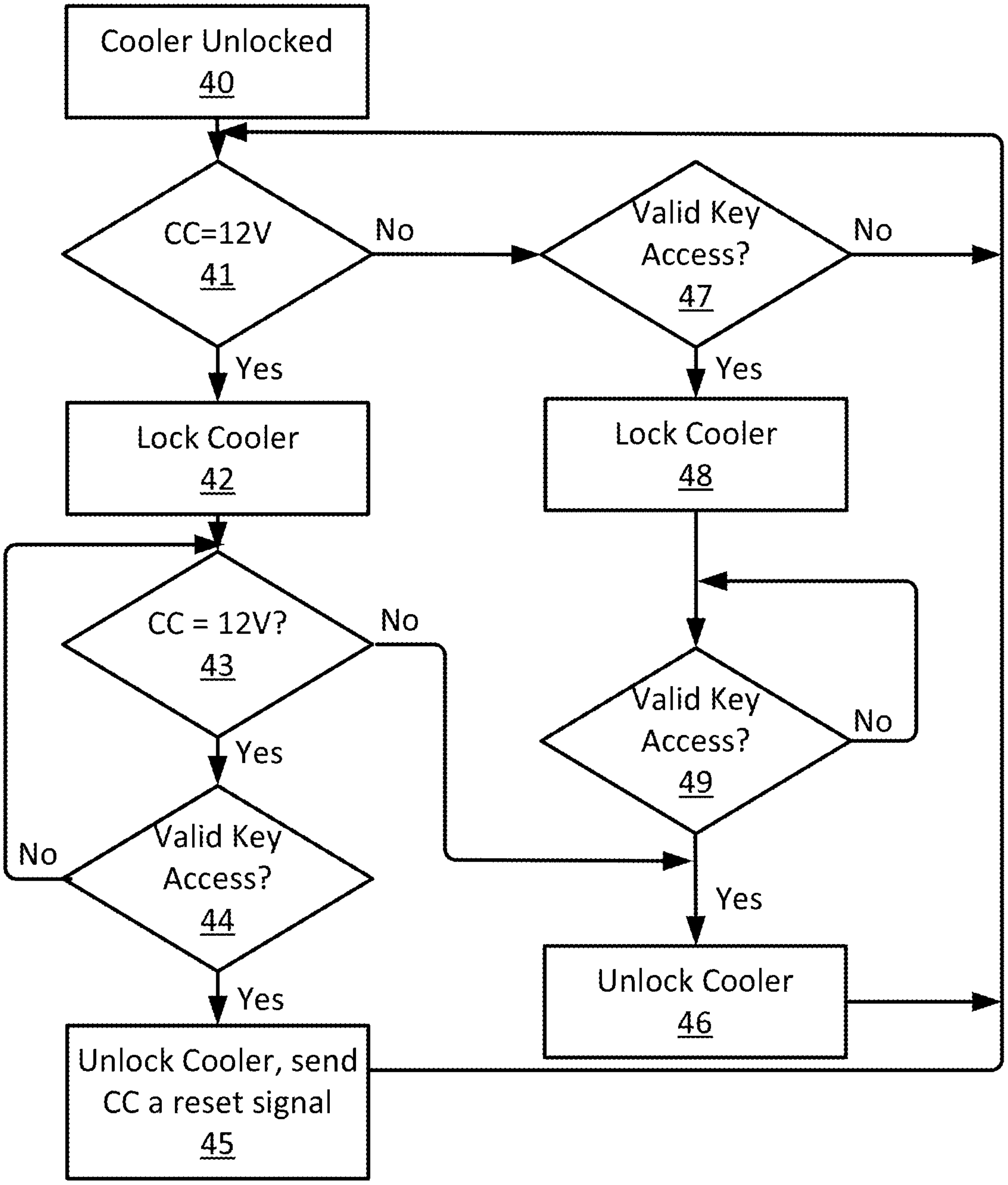
FIG. 16 is a process flow chart illustrating a process executed by a lock controller in an embodiment.

FIGS. 15 and 16 describe an example of the control logic of the cooler controller (CC) and the cooler lock (CL) in greater detail. Referring to FIG. 15 first, the cooler controller process begins at stage 25, wherein the system powers up. Subsequently at stage 26, the cooler is unlocked, e.g., the cooler controller outputs a 0V signal to the lock. The cooler controller then determines at stage 27 whether the internal temperature of the cooler is at or below a threshold value such as 38° F. If the temperature is determined to be at or below the threshold value, the process continues to stage 28, wherein the cooler controller determines if the system is in service mode as described above. In the event that the system is in service mode, the process flows to stage 29, wherein a 30 minute delay, or other suitable delay period, is imposed and the process flows back into stage 28.

If instead it was determined that the system is not in service mode, the process flows to stage 30, wherein the cooler controller determines whether there has been a power loss exceeding some time threshold, such as 2 minutes. If so, the process flows to stage 31, wherein the cooler controller determines whether there is a probe fault, and if there is not, the process continues to stage 31*a*. At stage 31*a*, if the measured temperature is decreasing at a rapid rate, it is assumed the cooler is working properly and it may have been recently opened for service or re-filling, and thus it should remain unlocked and should not proceed to stage 32. If the temperature is not decreasing at a rapid rate, the process flows to stage 32. At stage 32, the cooler controller determines whether the internal temperature has been above a second threshold temperature, e.g., 42° F., for greater than a predetermined period, e.g., 15 minutes.

In the event that the temperature has not been above the second threshold temperature for greater than the predetermined period, the process flows back to stage 28. Otherwise, the process flows to stage 33, wherein the cooler controller locks the cooler, e.g., by sending a 12V signal to the lock motor. From stage 33, the cooler controller determines at stage 34 whether a reset signal has been received, and if such a signal has been received, the process returns to stage 26. Otherwise, the process flows back to stage 33.

Returning to the decision stages 30 and 31, if either of these stages results in an affirmative determination (yes, probe faulted and/or yes power lost for greater than the prescribed period), then the process flows immediately to stage 33. From there, the process continues as described above.

Turning to FIG. 16, this figure shows the control process from the standpoint of the cooler lock controller. Starting at stage 40, the cooler is unlocked. Next at stage 41, it is determined whether a 12v (lock) signal is received from the cooler controller. If so, the cooler lock locks at stage 42. Subsequently at stage 43, the lock controller determines whether CC is set, e.g., whether it reads 12V. If so, the controller checks for a valid key access at stage 44. If a valid key access is detected at stage 44, the process continues to stage 45, wherein the lock controller unlocks the cooler and sends a cooler controller reset signal.

If at stage 43 it Is determined that CIF is not set, then the process flows to stage 46 to unlock the cooler and then returns to stage 41. If at stage 44 it is determined that there is no valid key access, then the process returns to stage 43.

If at stage 41 it determined that a 12v (lock) signal is not received from the cooler controller, the process looks for a valid key access at stage 47, and if such access is not found, proceeds back to stage 41. Otherwise, the process flows to stage 48, and the cooler is locked. Subsequently at stage 49, is again determined whether a valid key access has occurred. If so, the process moves on to stage 46 and continues thence as described above. If, however, no valid key access is found, the process loops at stage 49.

As noted above, FIG. 13 is a simplified schematic of a control system usable to implement the processes described herein. The illustrated system includes primarily a cooler controller 50 and a lock controller 51. Both controllers may be, for example, microcomputer or microprocessor-based controllers. In an alternative embodiment, the two microcomputers may be integrated together into a single microcomputer controller.

The cooler controller 50 includes input ports for power 52 and a temperature probe 53. The cooler controller 50 also includes outputs, e.g., for light control 54, lock control 55, lock controller power 56, as well as an Ethernet or other data connection 57 to access a LAN or a WAN, such as the Internet. The cooler controller 50 may also include a battery 58 for back-up purposes.

The lock controller SI includes a clock 60 and a lock actuator 61. The lock controller 51 also includes inputs for a key sensor 62, a keypad 63, a door sensor 64, and a latch position sensor 65. In an embodiment wherein a reset capability is included, the system also includes a reset line 66 providing input from the lock controller 51 to the cooler controller 50, as shown in FIG. 14.

It will be appreciated that a new and useful system for cooler lock function and control has been disclosed and described herein. However, while the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure are broader than the embodiments specifically disclosed and are encompassed within the claims appended hereto.

While certain features are described in conjunction with specific embodiments of the invention, these features are not limited to use with only the embodiment with which they are described, but instead may be used together with or separate from, other features disclosed in conjunction with alternate embodiments of the invention.

The invention claimed is:

1. An enclosure access control system for locking an enclosure having an enclosure body and an enclosure door which define a product storage area, the product storage area capable of storing a plurality of products, the plurality of products each being available to be selected by a consumer when the door is open, the system comprising:

a locking element on a first one of the enclosure body and the enclosure door;

a locking mechanism on a second one of the enclosure body and the enclosure door, the locking mechanism having an opening, the locking mechanism further including a latch mounted for movement between a latched position and an unlatched position, wherein the latch is in the latched position when the enclosure door is closed and is in the unlatched position when the enclosure door is open, the locking mechanism further including an electronically actuated latch engaging member adapted to engage the latch, and the locking mechanism further configured to selectively engage the locking element to lock and unlock the enclosure door to the enclosure body;

a first controller comprising a first microcomputer operatively connected to the locking mechanism for controlling actuation of the locking mechanism, wherein the first controller selectively provides a lock actuation signal to the locking mechanism;

a second controller comprising a second microcomputer having control logic to process inputs from at least one data input port to determine whether a fault event requiring the enclosure to be locked has occurred, wherein the second controller selectively provides a lock control signal to the first controller upon the occurrence of a fault event;

wherein the first controller and second controller are operatively connected.

2. An enclosure access control system for locking an enclosure during a power failure or fault event, the enclosure having an enclosure body and an enclosure door which define a product storage area, the product storage area capable of storing a plurality of products, the plurality of products each being available to be selected by a consumer during normal operation when the door is open, the system comprising:

a locking mechanism on the enclosure body, the locking mechanism having an opening and including a latch;

a locking element on the enclosure door and configured to enter the opening of the locking mechanism and contact a surface of the latch when the enclosure door is closed;

wherein the latch is adapted to releasably engage the locking element, the latch being mounted for movement between a latched position and an unlatched position, wherein the latch is in the unlatched position when the locking element is not in contact with the latch when the enclosure door is open, and is in the latched position when the locking element is in contact with the surface of the latch when the enclosure door is closed;

the locking mechanism further including an electronically-actuated latch engaging member configured to selectively engage the latch to lock the latch in the latched position;

lock controller circuitry associated with the electronically-actuated latch engaging member, for controlling movement of the electronically-actuated latch engaging member, wherein the lock controller circuitry selectively provides a lock actuation signal to the locking mechanism; and an AC power source for powering the lock controller circuitry during normal operation, and a battery for providing power to the lock controller circuitry allowing the lock controller circuitry to lock the door in response to one of a power failure and a fault event.

3. The system of claim 2, further comprising cooler controller circuitry communicably linked to the lock controller circuitry, wherein the lock controller circuitry is configured to restrict access to the product storage area when a temperature of the product storage area is at or above a pre-determined threshold temperature.

4. The system of claim 2, wherein the lock controller circuitry is configured to restrict unsecured access to the product storage area when a temperature of the product storage area is at room temperature.

5. The system of claim 2, wherein the lock controller circuitry is adapted to receive an electronic access signal from a remote interface.

6. The system of claim 5, wherein the remote interface is configured to transmit the electronic access signal over one of a local area network and wide area network.

7. The system of claim 2, wherein the lock controller circuitry is configured to permit unsecured access to the product storage area when a temperature of the product storage area is at or below a pre-determined threshold temperature.

8. The system of claim 2 wherein the lock controller circuitry comprises a first microcomputer, and wherein the first microcomputer is operatively connected to a second microcomputer for controlling the electronically-actuated latch engaging member.

9. An enclosure access control system for locking an enclosure having an enclosure body and an enclosure door which define a product storage area, the product storage area capable of storing a plurality of products, the plurality of products each being available to be selected by a consumer when the door is open, the system comprising:

a locking element on the enclosure door;

an electronic lock mechanism on the enclosure body, the electronic lock mechanism comprising a moveable latch configured to selectively engage the locking element to lock the enclosure door to the enclosure body, and to selectively disengage the locking element to unlock the enclosure door to the enclosure body, the electronic lock mechanism further comprising an electronic actuator operatively connected to an electronically actuated latch engaging member, the electronically actuated latch engaging member having an extended, locked position and a retracted, unlocked position;

lock controller circuitry associated with the electronic lock mechanism for actuating the the electronic actuated latch engaging member to take at least one of the actions of locking the enclosure door to the enclosure and unlocking the enclosure door to the enclosure body;

a manually operated reset signal transmitter configured to be located in a secured location, independent from the lock controller circuitry and external to the product storage area, to transmit a reset signal to the lock controller circuitry to selectively reset the electronic lock mechanism by unlocking the electronic lock mechanism after actuation of the electronic lock mechanism.

10. The system of claim 9, further comprising enclosure body controller circuitry to detect a fault event requiring the enclosure access control system to be locked.

11. The system of claim 9, wherein the lock controller circuitry is configured to permit unsecured access to the product storage area when a temperature of the product storage area is at or below a pre-determined threshold temperature.

12. The system of claim 9 further comprising an AC power source for powering the lock controller circuitry during normal operation, and a battery for providing power to the lock controller circuitry allowing the lock controller circuitry to continue to function during a power failure.

13. The system of claim 9 wherein the lock controller circuitry comprises a first microcomputer, and wherein the first microcomputer is operatively connected to a second microcomputer for controlling the electronically-actuated latch engaging member.

14. The system of claim 1, wherein the locking mechanism includes a sensor for detecting a reset signal to selectively unlock the locking mechanism after actuation of the locking mechanism.

15. The system of claim 2, wherein the locking mechanism includes a sensor for detecting a reset signal to selectively unlock the locking mechanism after actuation of the locking mechanism.

16. The system of claim 2, wherein the controller further comprises a data communication port configured to communicate at least one operation control parameter.

17. The system of claim 1, wherein the first controller is configured in a normal operation mode to permit access to the product storage area, and further configured to operate in a fault condition to restrict access to the product storage area.

18. The system of claim 2 further comprising at least one unlocking device to selectively unlock the locking mechanism, the at least one unlocking device configured to generate a first unlock signal for unlocking the lock mechanism, and further configured to generate a second unlock signal for unlocking the lock mechanism.

19. The system of claim 2, further comprising a first unlocking device to selectively unlock the locking mechanism and a second unlocking device to selectively unlock the locking mechanism.

20. The system of claim 2, wherein the controller is configured to receive at least one unlock signal, the controller comprising a plurality of data input ports configured for detecting the at least one unlock signal.

21. The system of claim 2, wherein the controller comprises a sensor for detecting an authorized or secure signal, wherein the controller actuates the locking mechanism in response to detecting the authorized or secured signal.

22. The system of claim 17, wherein the controller further configured to being powered by a first power source and a second power source for actuating the locking mechanism, the controller being powered by the second power source and subsequently operating in the normal operation mode following a loss of the first power source.

23. The system of claim 2 wherein the enclosure includes the enclosure body and one or more enclosure doors.

24. An enclosure access control system for locking an enclosure having an enclosure body and an enclosure door which define a product storage area, the product storage area capable of storing a plurality of products, the plurality of products each being available to be selected by a consumer when the door is open, the system comprising:

a locking element on a first one of the enclosure body and the enclosure door;

a locking mechanism on a second one of the enclosure body and the enclosure door, the locking mechanism having an opening, the locking mechanism further including a latch mounted for movement between a latched position and an un latched position, wherein the latch is in the latched position when the enclosure door is closed and is in the unlatched position when the enclosure door is open, the locking mechanism further including an electronically actuated latch engaging member adapted to engage the latch, and the lock mechanism further configured to selectively engage the locking element to lock and unlock the enclosure door to the enclosure body;

a controller comprising circuitry operatively connected to the locking mechanism for controlling actuation of the locking mechanism, wherein the circuitry selectively provides a lock actuation signal to the locking mechanism;

the controller configured to operate in a normal operation mode to permit public access to the product storage area by the consumer and further configured to operate in a fault condition to restrict public access to the product storage area by the consumer;

the controller further configured in the normal operation to permit public access to the product storage area as a temperature of the product storage area timely transitions from a predetermined fault temperature level or limit to a proper temperature level; and the controller having one of control logic and control circuitry to process inputs from at least one input port to determine whether a fault event of the temperature of the product storage area is at the predetermined fault temperature level or limit for one or more minutes during normal operation, whereupon the controller actuates the locking mechanism to the locked position and the controller transitions to the fault condition.

25. The system of claim 24, wherein the lock controller is configured to restrict public access to the product storage area when a temperature of the product storage area is at room temperature.

26. The system of claim 24, wherein the lock controller circuitry is configured to receive an electronic access signal from a remote interface.

27. The system of claim 26, wherein the remote interface is configured to transmit the electronic access signal over one of a local area network and wide area network.

28. The system of claim 24, wherein the lock controller circuitry is configured to permit unsecured access to the product storage area when a temperature of the product storage area is at or below a pre-determined threshold temperature.

29. The system of claim 24 further comprising an AC power source for powering the lock controller during normal operation, a battery for providing power to transition the lock controller to the fault condition, and the door being locked in response to one of a power failure and a fault event.

30. The system of claim 29 wherein the lock controller operates in the normal operation for a period of time while being powered by the battery prior to the door being locked in response to the one of a power failure and a fault event.

31. The system of claim 24, wherein the locking mechanism includes a sensor for detecting a reset signal to selectively unlock the locking mechanism after actuation of the locking mechanism.

32. The system of claim 24, wherein the controller further comprises a data communication port configured to communicate at least one of a latch position signal and a latch engaging member position signal.

33. The system of claim 24 further comprising at least one unlocking device to selectively unlock the locking mechanism, the at least one unlocking device configured to generate a first unlock signal for unlocking the lock mechanism, and further configured to generate a second unlock signal for unlocking the lock mechanism.

34. The system of claim 24, further comprising a first unlocking device to selectively unlock the locking mechanism and a second unlocking device to selectively unlock the locking mechanism.

35. The system of claim 24, wherein the controller is configured to receive at least one unlock signal, the controller comprising a plurality of data input ports configured for detecting the at least one unlock signal.

36. The system of claim 24, wherein the controller comprises a sensor for detecting an authorized or secure signal, wherein the controller actuates the locking mechanism in response to detecting the authorized or secured signal.

37. The system of claim 24 wherein the enclosure includes the enclosure body and one or more enclosure doors.

38. An enclosure access control system for locking an enclosure having an enclosure body and an enclosure door which define a product storage area, the product storage area capable of storing a plurality of products, the plurality of products each being available to be selected by a consumer when the door is open, the system comprising:

a locking element on a first one of the enclosure body and the enclosure door;

a locking mechanism on a second one of the enclosure body and the enclosure door, the locking mechanism having an opening, the locking mechanism further including a latch mounted for movement between a latched position and an un latched position, wherein the latch is in the latched position when the enclosure door is closed and is in the unlatched position when the enclosure door is open, the locking mechanism further including an electronically actuated latch engaging member adapted to engage the latch, and the lock mechanism further configured to take at least one of the actions of locking the enclosure door to the enclosure body and unlocking the enclosure door to the enclosure body;

a controller comprising a microcomputer operatively connected to the locking mechanism for controlling actuation of the locking mechanism, the controller further comprising a data input communication port for detecting an authorized signal transmitter to detect an event requiring the enclosure to be unlocked, whereupon the controller selectively provides a lock actuation signal to the locking mechanism for unlocking the locking mechanism.

39. The system of claim 38 further comprising cooler controller circuitry communicably linked to the lock controller circuitry, wherein the lock controller circuitry is configured to restrict access to the product storage area when a temperature of the product storage area is at or above a pre-determined threshold temperature.

40. The system of claim 38, wherein the lock controller circuitry is configured to restrict unsecured access to the product storage area when a temperature of the product storage area is at room temperature.

41. The system of claim 38, wherein the lock controller circuitry is configured to receive an electronic access signal from a remote interface.

42. The system of claim 41, wherein the remote interface is configured to transmit the electronic access signal over one of a local area network and wide area network.

43. The system of claim 38 wherein the lock controller circuitry comprises a first microcomputer, and wherein the first microcomputer is operatively connected to a second microcomputer for controlling the electronically-actuated latch engaging member.

44. The system of claim 38, wherein the lock controller circuitry is configured to permit unsecured access to the product storage area when a temperature of the product storage area is at or below a pre-determined threshold temperature.

45. The system of claim 38 further comprising an AC power source for powering the lock controller circuitry, and a battery for providing power to the lock controller circuitry allowing the lock controller circuitry to continue to function during a power failure.

46. The system of claim 38, wherein the controller further comprises a data communication port configured to communicate at least one of a latch position signal and a latch engaging member position signal.

47. The system of claim 38, wherein the controller is configured in a normal operation mode to permit access to the product storage area, and further configured to operate in a fault condition to restrict access to the product storage area.

48. The system of claim 38, wherein the controller further configured to being powered by a first power source and a second power source for actuating the locking mechanism, the controller being powered by the second power source and subsequently operating in the normal operation mode following a loss of the first power source.

49. The system of claim 38 further comprising at least one unlocking device to selectively unlock the locking mechanism, the at least one unlocking device configured to generate a first unlock signal for unlocking the lock mechanism, and further configured to generate a second unlock signal for unlocking the lock mechanism.

50. The system of claim 38, further comprising a first unlocking device to selectively unlock the locking mechanism and a second unlocking device to selectively unlock the locking mechanism.

51. The system of claim 38, wherein the controller is configured to receive at least one unlock signal, the controller comprising a plurality of data input ports configured for detecting the at least one unlock signal.

52. The system of claim 38, wherein the controller comprises a sensor for detecting an authorized or secure signal, wherein the controller actuates the locking mechanism in response to detecting the authorized or secured signal.

53. The system of claim 38 wherein the enclosure includes the enclosure body and one or more enclosure doors.

54. An enclosure access control system for locking an enclosure having an enclosure body and an enclosure door which define a product storage area, the product storage area capable of storing a plurality of products, the plurality of products each being available to be selected by a consumer when the door is open, the system comprising:
- a locking element on a first one of the enclosure body and the enclosure door;
- a locking mechanism on a second one of the enclosure body and the enclosure door, the locking mechanism having an opening, the locking mechanism further including a latch mounted for movement between a latched position and an unlatched position, wherein the latch is in the latched position when the enclosure door is closed and is in the unlatched position when the enclosure door is open, the locking mechanism further including an electronically actuated latch engaging member adapted to engage the latch, and the lock mechanism further configured to take at least one of the actions of locking the enclosure door to the enclosure body and unlocking the enclosure door to the enclosure body;
- a controller comprising a microcomputer operatively connected to the locking mechanism for controlling actuation of the locking mechanism, wherein the controller selectively provides a lock actuation signal to the locking mechanism;
- the controller further comprising an output communication port configured to communicate at least one of a latch position signal and a latch engaging member position signal.

55. The system of claim 54 wherein the lock controller circuitry comprises a first microcomputer, and wherein the first microcomputer is operatively connected to a second microcomputer for controlling the electronically-actuated latch engaging member.

56. The system of claim 54, wherein the controller further configured to being powered by a first power source and a second power source for actuating the locking mechanism, the controller being powered by the second power source following a loss of the first power source.

57. The system of claim 54 wherein the enclosure includes the enclosure body and one or more enclosure doors.

58. An enclosure access control system for locking an enclosure having an enclosure body and an enclosure door which define a product storage area, the product storage area capable of storing a plurality of products, the plurality of products each being available to be selected by a consumer when the door is open, the system comprising:
- a locking element on a first one of the enclosure body and the enclosure door;
- a locking mechanism on a second one of the enclosure body and the enclosure door, the locking mechanism having an opening, the locking mechanism further including a latch mounted for movement between a latched position and an un latched position, wherein the latch is in the latched position when the enclosure door is closed and is in the unlatched position when the enclosure door is open, the locking mechanism further including an electronically actuated latch engaging member adapted to engage the latch, and the lock mechanism further configured to take at least one of the actions of locking the enclosure door to the enclosure body and unlocking the enclosure door to the enclosure body;
- a first controller comprising a first microcomputer operatively connected to the locking mechanism for controlling actuation of the locking mechanism, wherein the first controller selectively provides a lock actuation signal to the locking mechanism;
- a secure unlocking signal transmitter to selectively unlock the electronic lock mechanism after actuation of the electronic lock mechanism;
- a second controller comprising a second microcomputer and further comprising an input port configured to communicate with the secure unlocking signal transmitter; and
- wherein the first controller and second controller are operatively connected.

59. The system of claim 58, wherein one of the first and the second controller is configured to receive an electronic access signal from a remote interface.

60. The system of claim 59, wherein the remote interface is configured to transmit the electronic access signal over one of a local area network and wide area network.

61. The system of claim 58 further comprising an AC power source for powering the first and second controllers, and a battery for providing power to the first controller allowing the first controller to continue to function during a power failure.

62. The system of claim 58, wherein one of the first and second controller further comprises a data communication port configured to communicate at least one of a latch position signal and a latch engaging member position signal.

63. The system of claim 58, wherein one of the first and second controller is configured in a normal operation mode to permit access to the product storage area, and further configured to operate in a fault condition to restrict access to the product storage area.

64. The system of claim 58 further comprising at least one unlocking device to selectively unlock the locking mechanism, the at least one unlocking device configured to generate a first unlock signal for unlocking the lock mechanism, and further configured to generate a second unlock signal for unlocking the lock mechanism.

65. The system of claim 58, further comprising a first unlocking device to selectively unlock the locking mechanism and a second unlocking device to selectively unlock the locking mechanism.

66. The system of claim 58, wherein at least one of the first and the second controller is configured to receive at least one unlock signal, the at least one of the first and second controller comprising a plurality of data input ports configured for detecting the at least one unlock signal.

67. The system of claim 58, wherein the at least one of the first and the second controller comprises a sensor for detecting an authorized or secure signal, wherein one of the first and the second controllers actuates the locking mechanism in response to detecting the authorized or secured signal.

68. The system of claim 58 wherein the enclosure includes the enclosure body and one or more enclosure doors.

69. The system of claim 1, wherein the first and second lock controllers are configured to restrict access to the product storage area when a temperature of the product storage area is at or above a pre-determined threshold temperature.

70. The system of claim 2, wherein the lock controller circuitry operates in the normal operation for a period of time while being powered by the battery prior to the door being locked in response to the one of a power failure and a fault event.

71. The system of claim 1, wherein the first and second controllers are configured to restrict unsecured access to the product storage area when a temperature of the product storage area is at room temperature.

72. The system of claim 1, wherein one of the first and the second lock controllers is configured to receive an electronic access signal from a remote interface.

73. The system of claim 72, wherein the remote interface is configured to transmit the electronic access signal over one of a local area network and wide area network.

74. The system of claim 1, wherein the first and second controllers are configured to permit unsecured access to the product storage area when a temperature of the product storage area is at or below a pre-determined threshold temperature.

75. The system of claim 1 further comprising an AC power source for powering the first and second controllers during normal operation, and a battery for providing power to at least one of the first and second lock controller allowing the at least one of the first and second lock controller to continue to function during a power failure.

76. The system of claim 1, wherein one of the first and second controllers further comprises a data communication port configured to communicate at least one of a latch position signal and a latch engaging member position signal.

77. The system of claim 9, wherein the controller further comprises a data communication port configured to communicate at least one of a latch position signal and a latch engaging member position signal.

78. The system of claim 1 further comprising at least one unlocking device to selectively unlock the locking mechanism, the at least one unlocking device configured to generate a first unlock signal for unlocking the locking mechanism, and further configured to generate a second unlock signal for unlocking the locking mechanism.

79. The system of claim 1, further comprising a first unlocking device to selectively unlock the locking mechanism and a second unlocking device to selectively unlock the locking mechanism.

80. The system of claim 9 further comprising at least one unlocking device to selectively unlock the lock mechanism, the at least one unlocking device configured to generate a first unlock signal for unlocking the lock mechanism, and further configured to generate a second unlock signal for unlocking the lock mechanism.

81. The system of claim 9, further comprising a first unlocking device to selectively unlock the lock mechanism and a second unlocking device to selectively unlock the lock mechanism.

82. The system of claim 1, wherein at least one of the first and the second controller is configured to receive at least one unlock signal, at least one of the first and second controller comprising a plurality of data input ports configured for detecting the at least one unlock signal.

83. The system of claim 9, wherein the controller circuitry is configured to receive at least one unlock signal, the controller circuitry comprising a plurality of data input ports configured for detecting the at least one unlock signal.

84. The system of claim 1, wherein at least one of the first and the second controllers comprises a sensor for detecting an authorized or secure signal, wherein the one at least one of the first and second controllers actuates the locking mechanism in response to detecting the authorized or secured signal.

85. The system of claim 9, wherein the controller circuitry comprises a sensor for detecting an authorized or secure signal, wherein the controller actuates the lock mechanism in response to detecting the authorized or secured signal.

86. The system of claim 1 wherein the enclosure includes the enclosure body and one or more enclosure doors.

87. The system of claim 9 wherein the enclosure includes the enclosure body and one or more enclosure doors.

88. An enclosure access control system for locking an enclosure having an enclosure body and an enclosure door which define a product storage area, the product storage area capable of storing a plurality of products, the plurality of products each being available to be selected by a consumer when the door is open, the system comprising:

- a locking element on a first one of the enclosure body and the enclosure door;
- a locking mechanism on a second one of the enclosure body and the enclosure door, the locking mechanism having an opening, the locking mechanism further including a latch mounted for movement between a latched position and an un latched position, wherein the latch is in the latched position when the enclosure door is closed and is in the unlatched position when the enclosure door is open, the locking mechanism further including an electronically actuated latch engaging member adapted to engage the latch, and the lock mechanism further configured to take at least one of the actions of locking the enclosure door to the enclosure body and unlocking the enclosure door to the enclosure body;
- a controller comprising a microcomputer operatively connected to the locking mechanism for controlling actuation of the locking mechanism, the controller further comprising a data input communication port for detecting an authorized signal transmitted from a secured location requiring the enclosure to be unlocked, whereupon the controller selectively provides a lock actuation signal to the locking mechanism for unlocking the locking mechanism.

89. The system of claim 88 further comprising cooler controller circuitry communicably linked to the lock controller circuitry, wherein the lock controller circuitry is configured to restrict access to the product storage area when a temperature of the product storage area is at or above a pre-determined threshold temperature.

90. The system of claim 88, wherein the lock controller circuitry is configured to restrict unsecured access to the product storage area when a temperature of the product storage area is at room temperature.

91. The system of claim 88, wherein the lock controller circuitry is configured to receive an electronic access signal from a remote interface.

92. The system of claim 91, wherein the remote interface is configured to transmit the electronic access signal over one of a local area network and wide area network.

93. The system of claim 88 wherein the lock controller circuitry comprises a first microcomputer, and wherein the first microcomputer is operatively connected to a second microcomputer for controlling the electronically-actuated latch engaging member.

94. The system of claim 88, wherein the lock controller circuitry is configured to permit unsecured access to the product storage area when a temperature of the product storage area is at or below a pre-determined threshold temperature.

95. The system of claim 88 further comprising an AC power source for powering the lock controller circuitry, and a battery for providing power to the lock controller circuitry allowing the lock controller circuitry to continue to function during a power failure.

96. The system of claim 88, wherein the controller further comprises a data communication port configured to communicate at least one of a latch position signal and a latch engaging member position signal.

97. The system of claim 88, wherein the controller is configured in a normal operation mode to permit access to the product storage area, and further configured to operate in a fault condition to restrict access to the product storage area.

98. The system of claim 88, wherein the controller further configured to being powered by a first power source and a second power source for actuating the locking mechanism, the controller being powered by the second power source and subsequently operating in the normal operation mode following a loss of the first power source.

99. The system of claim 88 further comprising at least one unlocking device to selectively unlock the locking mechanism, the at least one unlocking device configured to generate a first unlock signal for unlocking the lock mechanism, and further configured to generate a second unlock signal for unlocking the lock mechanism.

100. The system of claim 88, further comprising a first unlocking device to selectively unlock the locking mechanism and a second unlocking device to selectively unlock the locking mechanism.

101. The system of claim 88, wherein the controller is configured to receive at least one unlock signal, the controller comprising a plurality of data input ports configured for detecting the at least one unlock signal.

102. The system of claim 88 wherein the enclosure includes the enclosure body and one or more enclosure doors.

* * * * *